United States Patent
Bauer et al.

(10) Patent No.: US 11,846,866 B2
(45) Date of Patent: Dec. 19, 2023

(54) APPARATUS FOR THE SPECTRAL BROADENING OF LASER PULSES AND OPTICAL SYSTEM

(71) Applicant: TRUMPF Laser GmbH, Schramberg (DE)

(72) Inventors: Dominik Bauer, Rottweil (DE); Jonathan Brons, Oberndorf (DE); Alexander Killi, Trossingen (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 17/965,801

(22) Filed: Oct. 14, 2022

(65) Prior Publication Data

US 2023/0038729 A1 Feb. 9, 2023

Related U.S. Application Data

(63) Continuation of application No. PCT/EP2021/059532, filed on Apr. 13, 2021.

(30) Foreign Application Priority Data

Apr. 16, 2020 (DE) ...................... 10 2020 204 808.8

(51) Int. Cl.
  *G02F 1/35* (2006.01)
  *H01S 3/00* (2006.01)
(52) U.S. Cl.
  CPC .......... *G02F 1/3503* (2021.01); *G02F 1/3507* (2021.01); *G02F 1/3511* (2013.01); *H01S 3/0092* (2013.01); *G02F 2201/17* (2013.01)

(58) Field of Classification Search
  CPC .... G02F 1/3503; G02F 1/3507; G02F 1/3511; G02F 2201/17; H01S 3/0092
  See application file for complete search history.

(56) References Cited

U.S. PATENT DOCUMENTS 9,847,615 B2 * 12/2017 Russbueldt ........... H01S 3/0057
2011/0299152 A1   12/2011 Mourou et al.
(Continued)

FOREIGN PATENT DOCUMENTS

DE      102014007159 A1   11/2015

OTHER PUBLICATIONS

Ueffing et al., "Nonlinear Pulse Compression in a Gas-Filled Multipass Cell", Optics Letters, vol. 43, No. 9, May 1, 2018, four pages. (Year: 2018).*

(Continued)

*Primary Examiner* — Daniel Petkovsek
(74) *Attorney, Agent, or Firm* — LEYDIG, VOIT & MAYER, LTD.

(57) ABSTRACT

An apparatus for spectral broadening of laser pulses includes a main body, a plurality of mirror elements fastened to the main body, each having a mirror surface formed thereon and configured to reflect the laser pulses the plurality of mirror elements being fastened to a main body, and at least one nonlinear optical medium for the passage of the laser pulses for the generation of a nonlinear phase ($\Phi_{NL}$) by self-phase modulation. The at least one nonlinear optical medium may be a sheet-like and disk-shaped solid-state optical medium and/or a gaseous optical medium.

27 Claims, 5 Drawing Sheets

(56) References Cited

U.S. PATENT DOCUMENTS

| | | |
|---|---|---|
| 2015/0372440 A1 | 12/2015 | Nakayama |
| 2017/0125964 A1 | 5/2017 | Russbueldt et al. |
| 2019/0173257 A1 | 6/2019 | Bauer et al. |
| 2022/0137483 A1* | 5/2022 | Metzger ............... H01S 3/0057 359/326 |

OTHER PUBLICATIONS

Patrick L Kramer et al, "Enabling high repetition rate nonlinear THz science with a kilowatt-class sub-100 fs laser source," Optic Express, May 21, 2020, pp. 16951-16967, vol. 28, Issue 11, Optica Publishing Group, Washington, DC, USA.

Thomas Dietz et al., "Ultrafast thin-disk multi-pass amplifier system providing 1.9 kW of average output power and pulse energies in the 10 mJ range at 1 ps of pulse duration for glass-cleaving applications," Optics Express, Apr. 2020, pp. 11415-11423, Optica Publishing Group, San Jose, California, United States.

L. Lavenu et al., "Nonlinear pulse compression based on a gas-filled multipass cell," Optics Letters, May 2018, pp. 2252-2255, Optica Publishing Group, San Jose, California, United States.

* cited by examiner

APPARATUS FOR THE SPECTRAL BROADENING OF LASER PULSES AND OPTICAL SYSTEM

CROSS REFERENCE TO RELATED APPLICATIONS

This application is a continuation of International Application No. PCT/EP2021/059532 (WO 2021/209434 A1), filed on Apr. 13, 2021, and claims benefit to German Patent Application No. DE 10 2020 204 808.8, filed on Apr. 16, 2020. The aforementioned applications are hereby incorporated by reference herein.

FIELD

The present invention relates to an apparatus for the spectral broadening of laser pulses, and to an optical system having such an apparatus.

BACKGROUND

The generation of ultrashort laser pulses with pulse durations of the order of approximately 10 fs to approximately 100 fs is advantageous for certain applications, for example for generating x-ray or EUV radiation. For material processing, too, the generation of pulse durations shorter than 400 fs is advantageous, that is to say pulse durations that are shorter than the pulse durations of the order of approximately 800 fs that are usually achievable by high-power laser sources or high-power (disk) laser amplifiers. In particular, the high power of the laser pulses can also be generated with the aid of amplifier materials suitable for high powers, for example with the aid of ytterbium-doped materials.

To shorten the pulse duration of laser pulses, the practice of undertaking a nonlinear spectral broadening of the laser pulses and of temporally compressing the laser pulses after the spectral broadening is known, for the purposes of which dispersive optical elements, for example, can be used. The pulse duration of the laser pulses can typically be shortened by a factor of 10-20 in this way, with the pulse and beam quality being largely maintained.

A medium with non-linear optical properties, in which the laser pulses obtain a nonlinear phase as a result of self-phase modulation and hence new frequencies are generated, can be used for the spectral broadening of laser pulses. The cause for the self-phase modulation or the nonlinear phase shift can be found in the Kerr effect, that is to say a nonlinear refractive index change that depends on the intensity of the laser radiation propagating through the nonlinear optical medium.

Various nonlinear optical media can be used to generate the self-phase modulation. By way of example, optical fibers or optical hollow core fibers can be used to this end. Another option consists of the laser beam passing through a nonlinear solid-state medium (bulk material). By way of example, the laser beam in this case can pass through a transparent plate comprising a nonlinear material with a nonlinear refractive index, for example $SiO_2$, as described in US2011/0299152A1.

A further option for generating the self-phase modulation consists in the use of a multipass cell (Herriott cell) filled with a gas serving as a nonlinear optical medium. By way of example, argon is used as a nonlinear optical medium in a gas-filled multipass cell in the article "Nonlinear pulse compression based on a gas-filled multipass cell", L. Lavenu et al., Optics Letters, Vol. 43, No. 10, 2018.

DE 10 2014 007 159 A1 likewise describes a multipass cell having a nonlinear optical medium in the form of a gaseous medium or a solid-state medium. The multipass cell comprises at least two mirror elements, at which laser pulses passing through the cell are reflected multiple times. The nonlinear solid-state medium may be arranged between the mirror elements as an optical element. A substrate of a mirror element, on the back side of which a highly reflective coating has been applied, can also serve as a nonlinear solid-state medium. In place of the mirror substrate, a thin optical element applied to the front side of the mirror element may also be used as a nonlinear optical solid-state medium. The thin nonlinear optical element can be optically contact bonded, adhesively bonded, epitaxially applied or fastened to the mirror element in any other way.

The arrangement used to generate the self-phase modulation influences the beam caustic or the beam guidance, and hence the resultant beam quality. As described in DE 10 2014 007 159 A1, the Gouy parameter $\psi$ of the optical arrangement, which denotes the Gouy phase or the Gouy phase difference collected by a transverse eigenmode (fundamental mode) during a pass through the optical arrangement, should ideally be chosen for free propagation such that it is neither at the edge nor in the center of the stability range of an equivalent resonator, i.e.: $0<\psi<\pi$. For a good compressibility of the laser pulses, it is moreover advantageous if the nonlinearity can be introduced in doses that are as small as possible, in a manner matched to the propagation.

Gas filled or back side-coated Herriott cells are frequently used for high average powers and moderate pulse energies in the µJ range to the single-digit mJ range. For pulse energies in the 100 mJ range and above, use is made of gas-filled Herriott cells typically with large focal diameters. As a consequence, the Herriott cells are comparatively long (e.g., a length of approximately 10 m in the case of a pulse energy of 200 mJ and a pulse duration to be compressed of 500 fs when helium is used as a fill gas) and the monolithic mirror elements require large diameters of 4 inches and more.

SUMMARY

In an embodiment, the present disclosure provides an apparatus for spectral broadening of laser pulses that includes a main body, a plurality of mirror elements fastened to the main body, each having a mirror surface formed thereon and configured to reflect the laser pulses, the plurality of mirror elements being fastened to a main body, and at least one nonlinear optical medium for the passage of the laser pulses for the generation of a nonlinear phase ($\Phi_{NL}$) by self-phase modulation. The at least one nonlinear optical medium may be a sheet-like and disk-shaped solid-state optical medium and/or a gaseous optical medium.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
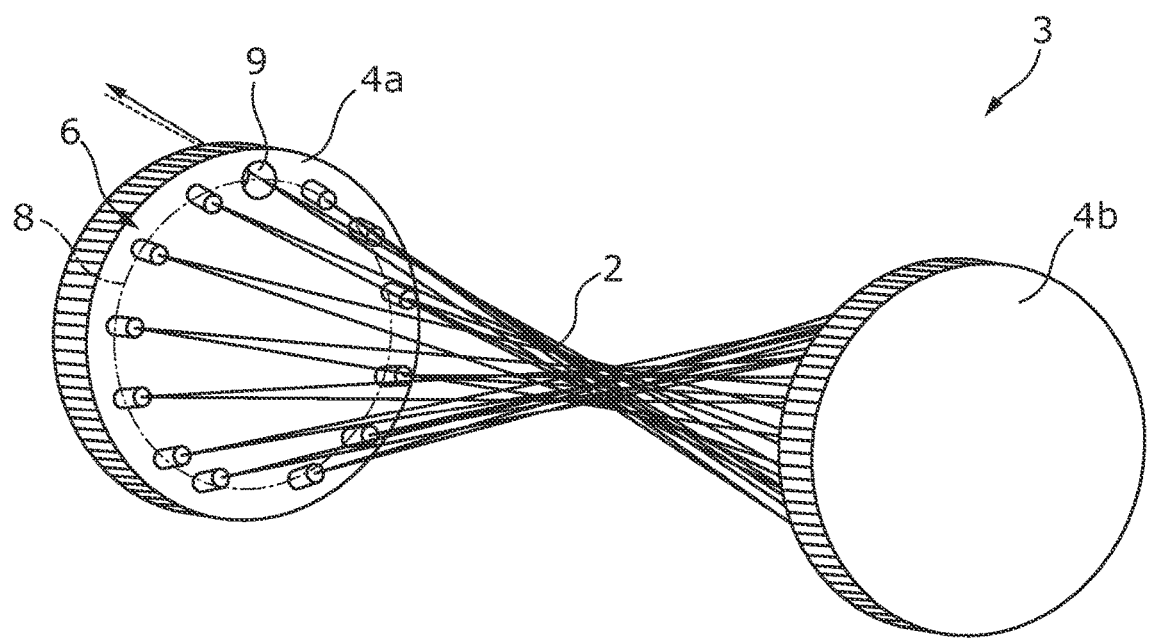
FIGS. 1a and 1b show schematic representations of an example of an apparatus for the spectral broadening of laser pulses with the aid of sheet-like nonlinear solid-state media in a multipass cell for multiple reflections of the laser pulses.

In an aspect, the invention provides an apparatus for the spectral broadening of laser pulses with high pulse energies, the apparatus having a compact structure. The invention provides an optical system having such an apparatus.

In an aspect, the present invention provides an apparatus for the spectral broadening of laser pulses, comprising: a plurality of mirror elements, on each of which a mirror surface for reflecting the laser pulses is formed, the plurality of mirror elements being fastened to a main body, and also at least one preferably sheet-like, in particular disk-shaped nonlinear optical solid-state medium and/or a gaseous nonlinear optical medium for the passage of the laser pulses for the generation of a nonlinear phase by self-phase modulation. The nonlinear optical solid-state medium may be spaced apart from the main body or from the mirror elements, or may be attached or fastened to the respective mirror surface. The laser pulses propagate at least once through the nonlinear solid-state medium and/or through the gaseous nonlinear optical medium. The gaseous nonlinear optical medium is typically located in the surroundings of the mirror elements or the mirror surfaces, or these are arranged in the gaseous nonlinear optical medium.

The apparatus according to the invention exploits the fact that no monolithic mirror element, as described for example in DE 10 2014 007 159 A1 cited at the outset, is required within the scope of spectral broadening of the laser pulses. Instead, it is sufficient to use a plurality of a comparatively small mirror elements for the reflection of the laser pulses.

The production or (final) processing of the mirror surfaces of these mirror elements is substantially less complicated, and hence less expensive, than in the case of monolithic mirror elements with comparatively large diameters. Additionally, only the corresponding mirror element needs to be replaced in the case of damage to a respective mirror element whereas the entire mirror needs to be replaced if there is damage to the reflective coating of a large monolithic mirror.

The apparatus can be brought out of adjustment as a result of long-term drifts, e.g., as a result of thermal cycles, if use is made of a plurality of individual mirrors that utilize separate optomechanical means for aligning the individual mirror elements. This is true especially in the case of the sought-after high average laser powers of the input laser radiation of, e.g., more than 50 W, in the case of which the misalignment of the apparatus can hardly be prevented.

As a result of the attachment to the main body which is generally made of a single piece or monolithically joined—the attachment typically being brought about by a secure or permanent connection, for example by direct joining (bonding), welding or adhesive bonding—it is possible to reduce the misalignment degrees of freedom to a minimum such that a misalignment of the mirror elements during the operation of the apparatus can be precluded for practical purposes.

As a rule, the nonlinear optical solid-state medium is not a laser-active solid-state medium suitable for amplifying the laser pulses (amplifier material). Such an amplifier material, in particular in the form of ytterbium-doped YAG, may act as a spectral filter and counteract the spectral broadening of the laser pulses such that the sought-after increase in the spectral bandwidth cannot be obtained or there cannot be a good subsequent temporal compression of the pulses. The apparatus for the spectral broadening of the laser pulses is typically designed to at least double the spectral bandwidth of the laser pulses radiated into the apparatus.

In an embodiment, a respective nonlinear optical solid-state medium is fastened to a surface of at least one mirror element on which the mirror surface is formed. The nonlinear optical solid-state media are typically designed in the form of plates. Each configuration requires an adaptation of the thickness of the plate. This leads to the plates having to be very thin for high pulse energies. As a rule, a low thickness of the nonlinear optical solid-state medium is not problematic when using comparatively small mirror elements, but this is difficult to realize when a large, back side-coated monolithic mirror element is used.

To obtain trueness of shape, a respective sheet-like, nonlinear optical solid-state medium is fastened to a surface of a respective mirror element. In this case, the geometry of the surface of the mirror element, to which the solid-state medium is fastened, typically corresponds to the geometry of the back side of the sheet-like solid-state medium such that the surface of the mirror element and the back side of the sheet-like solid-state medium extensively abut against one another. The mirror surface of the mirror element typically forms the interface between the nonlinear optical solid-state medium and the surface at which said medium is fastened to the mirror element.

The fastening of the nonlinear optical solid-state medium to the mirror element can be fixed, permanent fastening, established for example using a joining means, for example an adhesive. Optionally, the sheet-like nonlinear solid-state medium can be applied epitaxially or amorphously to the surface. Detachable fastening, for example by way of optical contact bonding to the surface of the mirror element, is also possible as a matter of principle. A detachable connection is advantageous since the latter allows a simple adaptation of the strength of the nonlinearity as sheet-like nonlinear optical solid-state media with different thicknesses and/or made of different materials can be fastened to the mirror element. Even in the case of permanent fastening there can be a fine adaptation of the thickness or the material of the nonlinear optical solid-state medium in order to generate optimized spectral pulse broadening.

In a preferred embodiment, the apparatus comprises a plurality of further mirror elements with further mirror surfaces, the plurality of further mirror elements being fastened to a further main body and the main body and the further main body being arranged at a given distance from one another for the purposes of forming a multipass cell. This embodiment exploits the fact that—as a person skilled in the art is well aware—in the case of a suitable alignment of the radiated-in laser pulses or in the case of suitable dimensioning of the multipass cell, the laser pulses in the multipass cell are generally incident only on specified positions along an ellipse, a circle or possibly a contour slightly deviating from a circular form around the optical axis of the multipass cell and are reflected from said positions. If a respective mirror element is positioned at these positions, which are typically arranged equidistantly in the circumferential direction, the typically monolithic mirror elements that usually delimit the multipass cell can be replaced by a plurality of comparatively small mirror elements for reflecting the laser pulses.

The pressure in the multipass cell can be reduced as a result of using a nonlinear optical solid-state medium in the large beam rather than a gaseous nonlinear optical medium, making it possible to counteract an ionization of the gas present in the multipass cell at the focus of the caustic that arises due to high pulse energies. This enables the realization of comparatively small focal diameters, and so it is possible to realize a more compact structure of the multipass cell.

However, the multipass cell can also be realized with a comparatively compact structure if the spectral broadening of the laser pulses is generated purely by a gaseous nonlinear optical medium, that is to say if the apparatus has no nonlinear optical solid-state medium. It is understood that the apparatus may also have a combination of a gaseous nonlinear optical medium and a nonlinear optical solid-state medium in order to bring about the spectral broadening.

In a development of this embodiment, a nonlinear optical solid-state medium is fastened to a surface of at least one of the further mirror elements on which the further mirror surface is formed. The number of mirror surfaces or further mirror surfaces of the multipass cell to which a nonlinear optical solid-state medium has been fastened depends on the nonlinear phase intended to be set by means of the multipass cell. In principle, the number of mirror surfaces or further mirror surfaces to which a nonlinear optical solid-state medium is fastened may vary between a single mirror surface or a single further mirror surface and all mirror surfaces and all further mirror surfaces of the multipass cell. In respect of the distribution of the nonlinear optical solid-state media among the mirror surfaces and the further mirror surfaces of the multipass cell, it was found to be advantageous if the nonlinear optical solid-state media are arranged with an aperiodic or non-periodic distribution.

In an embodiment, at least three nonlinear optical solid-state media are arranged in a beam path (propagation path) of the laser pulses in the apparatus, more precisely in the multipass cell, with the lengths of sections of the beam path between in each case two adjacent nonlinear optical solid-state media in the beam path being different. The lengths of the sections of the beam path between in each case two adjacent nonlinear optical solid-state media in the beam path preferably reduce with increasing length of the beam path of the laser pulses in the apparatus (as measured from the laser pulse entry into the apparatus). The at least three nonlinear optical solid-state media are typically fastened to at least three different mirror elements or further mirror elements.

In this embodiment, not every mirror element or further mirror element has a nonlinear optical solid-state medium fastened thereto. The above-described aperiodicity can be generated or promoted by the different lengths of the sections of the beam path of successive nonlinear optical solid-state media in the beam path. An increase in the nonlinear effects with the length of propagation of the laser pulses in the apparatus or with an increasing number of reflections at the mirror elements and optionally at the further mirror elements was found to be advantageous. Such an increase can be achieved by virtue of the lengths of the sections of the beam path between in each case two adjacent nonlinear optical solid-state media decreasing with increasing length of the beam path of the laser pulses in the apparatus.

In a further embodiment, at least two nonlinear optical solid-state media are fastened to at least one surface of at least one mirror element and/or to at least one surface of at least one further mirror element, the thickness of said nonlinear optical solid-state media differing from one another, with the thickness of the nonlinear optical solid-state media preferably increasing with increasing length of the beam path of the laser pulses in the apparatus (as measured from the laser pulse entry into the apparatus). An aperiodicity can also be generated or promoted by a variation in the thickness of the nonlinear optical solid-state media. An increase in the nonlinear effects in the apparatus with increasing length of the beam path of the laser pulses can also be achieved by way of an increasing thickness of the nonlinear optical solid-state media with increasing length of the beam path (under the assumption that one and the same material is used for the nonlinear optical solid-state media).

It is understood that the increase in the thickness of the nonlinear optical solid-state media and the increase in the density or number of nonlinear optical solid-state media with increasing length of the beam path in the apparatus can be combined in order to achieve an increase in the strength of the nonlinear effects with increasing length of the beam path in the apparatus. For this purpose, use can also be made of a plurality of different nonlinear optical solid-state media which differ in terms of their nonlinear refractive index, with the nonlinear refractive index of the respective nonlinear optical solid-state media increasing with increasing length of the beam path in the apparatus or with increasing number of reflections at the mirror surfaces or at the further mirror surfaces.

It is understood that the strength of the nonlinear effects collected by the laser pulses when passing through the apparatus need not necessarily increase with increasing length of the beam path.

In an embodiment, the mirror surface of at least one mirror element is formed by a (highly) reflective coating on a side of the sheet-like nonlinear optical solid-state medium that faces the mirror element and/or the mirror surface of at least one further mirror element is formed by a (highly) reflective coating on a side of the sheet-like nonlinear optical solid-state medium that faces the further mirror element. As described further above, the nonlinear optical solid-state medium is fastened to the surface of the mirror element by way of its back side. Should fastening be implemented using a joining means, it is advantageous if the (back) side of the nonlinear optical solid-state medium that faces the mirror element forms the mirror surface. Should the nonlinear optical solid-state medium be optically contact bonded to the surface of the mirror element, the surface of the mirror element may optionally have a reflective coating itself, that is to say the surface itself serves as a mirror surface in this case. On a side that faces away from the respective mirror surface or further mirror surface, the respective sheet-like nonlinear optical solid-state medium may have an antireflection coating or antireflection microstructuring.

In a further embodiment, at least one mirror surface and/or at least one further mirror surface is concavely curved and the respective sheet-like nonlinear optical solid-state medium preferably likewise is concavely curved. In the case of a multipass cell, the concave curvature is generally required to produce an image or to reflect the laser pulses along an ellipse or a circle at the specified positions described further above. The curvature of the mirror surfaces is adapted to match the physical and nonlinear material properties of the respective nonlinear optical solid-state medium. Additionally, the Gouy phase collected between mirror reflections over the course of the propagation in the multipass cell can be adapted by different (typically spherical) curvatures of the mirror surfaces. In addition to different curvatures of the mirror surfaces, it is also possible to use different materials for the nonlinear optical solid-state media of the individual mirror elements in order to adapt or suitably set the Gouy phase/the nonlinear effects over the course of the propagation through the multipass cell. Especially in the case of large radii of curvature, individual mirror elements or their mirror surfaces can have a planar embodiment (quasi collimated case). A convex curvature of the mirror surfaces is also possible (see below).

In a further embodiment, the plurality of mirror surfaces and the plurality of further mirror surfaces are all located on a common spherical surface. In the case of a multipass cell in the form of a Herriott cell, the mirror surfaces of the two mirror elements that delimit the cell each are spherically curved and have the same radius of curvature. The two centers of curvature of the spherically curved mirror surfaces are located on a common straight line that forms the optical axis (center axis) of the multipass cell. In the case described here, the mirror surfaces of the mirror elements and further mirror elements are each located on a common spherical surface, more precisely in a circle that forms a cut through the spherical surface.

In a further embodiment, the plurality of mirror surfaces and the plurality of further mirror surfaces have a radius of curvature of between 1 m and 15 m. In this case, the multipass cell is operated similarly to a concentric resonator which is robust vis-à-vis lenses at the focus. The radii of curvature of the mirror surfaces in each case fit to the chosen distance between the two main bodies, and hence to the length of the multipass cell.

In an alternative embodiment, the plurality of mirror surfaces and the plurality of further mirror surfaces have a radius of curvature of less than 1000 m and more than 10 m, preferably more than 20 m. In this case, the multipass cell is operated with quasi collimated beams or laser pulses within a plane parallel resonator regime.

When the multipass cell is operated with quasi collimated beams, the overall optical power of all mirror elements is preferably between 5 m$^{-1}$ and infinity m$^{-1}$. The paraxial approximation can be used for the calculation of the overall optical power in the case of quasi collimated beams and hence small angles.

In the case of the paraxial approximation, the overall optical power $D_{tot}$ is composed additively from the optical powers $D_i$ of the respective mirror elements. In this case, the optical power $D_i$ of the i-th mirror element is given by $D_i=1/f_i$, where $f_i$ denotes the focal length of the i-th mirror element. The following applies to the respective focal length $f_i$: $f_i=R_i/2$, where $R_i$ denotes the radius of curvature of the i-th mirror element.

In principle—especially in the case of quasi collimated beams—at least one mirror surface or one further mirror surface may have concave curvature, at least one mirror surface or one further mirror surface may have convex curvature and/or at least one mirror surface may have a planar embodiment. When determining the overall optical power, the radii of curvature of convexly curved mirror surfaces are counted negatively and the radii of curvature of concavely curved mirror surfaces are counted positively. The overall optical power of the concave and/or convex mirror surfaces is chosen such that the desired overall propagation sets in. For the above-described example of quasi collimated propagation, the overall optical power typically is located within the value range specified above, that is to say between approximately 5 m$^{-1}$ and infinity m$^{-1}$.

In a further embodiment, a distance between the main body and the further main body is less than 1.5 m, preferably less than 1 m. As described further above, the multipass cell described here, which is suitable for spectral broadening of laser pulses with pulse energies of more than approximately 100 mJ, can be realized with a comparatively small installation space.

In a further embodiment, the plurality of mirror elements form a deflection device, in the case of which the preferably planar mirror surfaces of the plurality of mirror elements are aligned such that the laser pulses are deflected from a respective mirror surface to another mirror surface via the disk-shaped nonlinear optical solid-state medium or via an exposed, preferably concavely curved mirror surface of an end mirror, with the deflection device and the disk-shaped nonlinear optical solid-state medium or the exposed mirror surface being arranged at a given distance from one another for the purposes of forming a multipass cell. A plurality of mirror elements is understood to mean at least two mirror elements, and as a rule more than two mirror elements. Typically, at least four mirror elements are fastened to the main body.

The inventors have recognized that, for example, the deflection device which is described in US 2019/0173257 A1 cited above and used in an optical amplifier, more precisely in a disk laser amplifier, there can also be used for the spectral broadening of laser pulses if a disk-shaped nonlinear optical solid-state medium is used in place of the disk-shaped laser-active medium. In addition to the disk-shaped laser-active medium which is arranged at a given distance from the main body of the deflection device, a nonlinear optical solid-state medium may also be attached to one or more deflection mirrors. The plurality of the mirror elements of the deflection device typically have planar mirror surfaces, i.e., the laser pulses are not, as a rule, focused at the deflection device. The use of the deflection device therefore allows operation without intermediate foci, and so an evacuation of the optical arrangement may optionally be dispensed with or the pressure need not be reduced to the same extent as in a multipass cell with an intermediate focus.

In this case, the nonlinear optical solid-state medium is arranged at the same location at which the disk-shaped laser-active medium is arranged in the laser amplifier. The nonlinear optical solid-state medium can be attached or fastened to a heat sink or to a mount or to an end mirror.

Alternatively, that multipass cell may have an end mirror, the mirror surface of which is arranged at the specified distance from the deflection device. In this case, the end mirror or its mirror body has an exposed mirror surface, to which no nonlinear optical solid-state medium has been fastened. In this case, the end mirror typically has a one-piece form and only has the exposed mirror surface and no further mirror surfaces. In the case of a suitably designed multipass cell, the end mirror, more precisely its diameter, can be dimensioned to be smaller than in the case of a conventional Herriott cell. The main body of the deflection device, to which the plurality of mirror elements have been attached, by contrast has, as a rule, a larger diameter.

Should the multipass cell have an end mirror with an exposed mirror surface, the nonlinear phase is generally produced by a gaseous nonlinear optical medium introduced between the end mirror and the deflection device. As an alternative or in addition to the use of the gaseous nonlinear optical medium, further preferably sheet-like nonlinear optical solid-state media, which generate the nonlinear phase or part of the nonlinear phase, may be fastened to the mirror elements of the deflection device.

Both for the case where the multipass cell has an exposed mirror surface and for the case where the multipass cell has at least one nonlinear optical solid-state medium, the specified distance from the deflection device is typically chosen such that a desired equivalent eigenmode can approximately exist in the multipass cell (see below). The typically planar mirror surfaces of the mirror elements of the deflection device are aligned in such a way in this case that a desired number of round trips, that is to say a desired number of reflections in the multipass cell between the sheet-like nonlinear solid-state medium or the exposed mirror surface and the deflection device, is realized. In this case, input and output coupling of the laser pulses can be implemented selectively by way of an opening in the main body of the deflection device (e.g., a hole for a missing or unoccupied mirror element), by way of separate input and/or output coupling mirrors or combinations thereof.

In a further embodiment, the apparatus comprises a housing, in which the multipass cell is arranged, and preferably a pump device for evacuating the housing. By way of example, the pump device can be a vacuum pump which reduces the pressure within the housing to, for example, approximately 100 mbar to approximately 0.1 mbar or less. Especially for the case where the intention is to spectrally broaden laser pulses with particularly high pulse energies, care should be taken that the gas or gases present in the multipass cell are not ionized. Reducing the pressure in the multipass cell allows the ionization of gases present in the multipass cell to be counteracted such that a smaller minimum beam diameter of the laser pulses can be produced in the multipass cell, likewise contributing to a reduction in the installation length of the said multipass cell.

In principle, a gaseous nonlinear optical medium can be used for the generation of the nonlinear phase, even if a pump device is used to evacuate the housing or to generate a reduced pressure in the multipass cell. However, a pump device can also be dispensed with, especially in this case. The housing of the multipass cell is gas-tight and typically has at least one window transparent to the wavelength(s) of the laser pulses for coupling the laser pulses into and from the multipass cell. Should a pump device be provided for evacuating the housing, the gas-tight housing must additionally also be pressure-tight.

In a further embodiment, the gaseous nonlinear medium is introduced into the housing and preferably selected from the group comprising: noble gases (He, Ne, Ar, Kr, Xe) or other polyatomic gases, e.g., nitrogen, or gas mixtures, in particular air. Within the meaning of this application, a gaseous nonlinear medium is also understood to mean a mixture of two or more gases which have been introduced into the housing. Both in this embodiment and in the case where no gaseous nonlinear medium has been introduced into the housing, it is advantageous to control the gas atmosphere in the housing, that is to say subject both the type of gas or gases in the housing and the pressure of the gas/gases in the housing to open-loop or optionally closed-loop control. To this end, the apparatus may comprise at least one controllable inlet valve and/or at least one controllable outlet valve. Moreover, the apparatus may comprise pressure measuring equipment or a pressure sensor for the closed-loop control of the pressure.

In an embodiment, the nonlinear optical solid-state medium has a mirror surface which is preferably concavely curved (when gazing in the beam direction onto the nonlinear optical solid-state medium). The solid-state medium typically has a mirror surface in the form of a (highly) reflective coating on a side that faces away from the deflection device in order to reflect the laser pulses back to the deflection device following the (double) pass through the solid-state medium. On a side that faces the deflection device, the nonlinear optical solid-state medium may have an antireflection coating or antireflection microstructuring. The mirror surface is typically concavely curved in order to counteract the divergence as a result of diffraction. The solid-state medium itself generally has a constant thickness and is therefore likewise curved. In detail, the curvature must be adapted in view of the diffraction and the Kerr lens to be expected. Instead of the nonlinear optical solid-state medium, the surface to which the solid-state medium has been applied may have the (preferably concavely curved) mirror surface. In this case, the nonlinear optical solid-state medium and the mirror surface have the same curvature.

In an embodiment, the mirror elements are arranged on the main body in at least one annulus, preferably in a plurality of annuli (or in a plurality of regular polygons, e.g., hexagons) concentrically about a center axis of the main body, on which the center of the disk-shaped nonlinear optical solid-state medium is typically also situated. As described in US 2019/0173257 A1 cited further above, a regular arrangement of the mirror elements in relation to the center axis allows only a small number of different types of mirror elements to be required.

In a further embodiment, at least two of the mirror elements between which the laser pulses are deflected to the disk-shaped nonlinear optical solid-state medium are arranged at different radial distances from a center axis of the main body for the purposes of generating a point of incidence of the laser pulses that is offset from a center on the disk-shaped nonlinear optical solid-state medium. The object of the deflection device described in US 2019/0173257 A1 is to strike the laser disk centrally with the laser beam. The inventors have recognized that, in the case of the apparatus described here, it is advantageous for the nonlinear optical solid-state medium to be struck by the laser pulses at different points of incidence since this is able to reduce the risk of exceeding the damage threshold in the nonlinear optical solid-state medium.

To let the laser pulses strike the nonlinear optical solid-state medium at an off-centered point of incidence, the two mirror elements between which the laser pulses are steered to the nonlinear optical solid-state medium can be arranged at different (radial) distances from the center axis. If a plurality of pairs of mirror elements are arranged in this way, that is to say at different distances from the center axis, the laser pulses are able to strike the nonlinear optical solid-state medium at a plurality of points of incidence offset from the center, which can further reduce the risk of exceeding the damage threshold. It is understood that it is not necessary for all mirror elements of the deflection arrangement to be arranged in the manner described above. By way of example, the radial distance from the center axis of the respective pairs of mirror elements can be kept constant in the case of mirror elements which have a comparatively small distance from the center axis such that the laser pulses strike at a point of incidence in the center of the nonlinear optical solid-state medium. In this case, too, it is possible by varying the positions of the mirror elements to pull apart the superimposing points of incidence in order to prevent the damage threshold from being exceeded.

In an embodiment, the deflection device is formed to deflect the laser pulses between at least two preferably adjacent mirror surfaces between two successive deflections to the nonlinear optical solid-state medium or the exposed mirror surface of the end mirror. In this embodiment, the laser pulses are typically deflected directly between the mirror surfaces of in each case two of the plurality of mirror elements of the deflection device before the laser pulses are radiated back onto the nonlinear optical solid-state medium again. The beam path between the mirror surfaces of two mirror elements which are typically arranged adjacently to one another in the circumferential direction and at which the laser pulses are deflected in the circumferential direction as a rule therefore contains no further optical elements, as is the case for the deflection device described in US 2019/0173257 A1.

In a further embodiment, the deflection device has at least one further mirror element with a curved mirror surface, with the laser pulses being deflected from a first of the plurality of mirror elements to the further mirror element and being deflected from the further mirror element to a second of the plurality of mirror elements. The embodiment described here deviates from the rule described above, that is to say the laser pulses reflected by the solid-state medium are deflected by a further mirror element with a curved mirror surface between the two mirror elements, and so the laser pulses are deflected or reflected three times at the deflection device before these are radiated back onto the solid-state medium again. As a rule, the curved mirror surface runs approximately parallel to the center axis of the apparatus such that the laser pulses are deflected by the mirror surface of the further mirror element in a plane approximately perpendicular to the said center axis.

The further mirror element, more precisely its curved mirror surface, allows the Gouy parameter of the apparatus to be adapted without limitation by the lens guide regime. For this purpose, the mirror surface may have a concave or convex spherical curvature; however, it is also possible and optionally necessary in the case of large angles for the mirror surface to have different curvatures in two mutually perpendicular spatial directions or for the mirror surface to be a free-form surface. An effectively homogenous spherical curvature for generating a focused beam profile of the laser pulses can be achieved in the case of different curvatures in two spatial directions, even in the case where the laser pulses strike the curved mirror surface at large angles of incidence. What is exploited here is that if a spherical mirror surface is struck at an angle then the effective curvature changes in this direction—in a manner similar to a tilted lens. This means that the spherical mirror surface is focused differently in one direction than in the other direction. To compensate this effect, it is advantageous if the above-described mirror surface has a different curvature in each of two spatial directions.

The use of a single disk-shaped nonlinear optical solid-state medium at a distance from the main body is advantageous for saving costs. However, it may be useful to increase the nonlinearity of the apparatus, especially at the start and at the end of the beam path of the laser pulses.

In a development, a preferably sheet-like nonlinear optical solid-state medium is fastened to a surface of the further mirror element. In addition to the nonlinear optical solid-state medium spaced apart from the deflection device or the main body, the further mirror element of the deflection device may comprise a nonlinear optical solid-state medium. Optionally, a respective nonlinear optical solid-state medium may also be formed on individual ones or optionally all of the plurality of mirror elements with the generally planar mirror surfaces in order to increase the nonlinearity.

In an alternative embodiment, a respective mirror element has a preferably planar mirror surface which is aligned to directly reflect the laser pulses, i.e., at the mirror surface of the respective mirror element, from the nonlinear optical solid-state medium or from the exposed mirror surface of the end mirror back to the nonlinear optical solid-state medium or back to the exposed mirror surface of the end mirror. In this case, the laser pulses are directly reflected back to the nonlinear optical solid-state medium at one and the same mirror surface, that is to say there is no direct deflection of the laser pulses between two mirror elements of the deflection device. What are known as 0° mirror elements, whose (planar) mirror surfaces are aligned perpendicular to the center axis of the respective mirror element, can be used to suitably align the mirror surfaces. In order to suitably align the mirror elements relative to the nonlinear optical solid-state medium, they are tilted with their respective center axis relative to the center axis of the sheet-like main body. It is likewise advantageous in this embodiment if the mirror elements are arranged at different radial distances from the center axis.

In a further embodiment, a distance between the main body and the disk-shaped nonlinear optical solid-state medium or the exposed mirror surface of the end mirror is less than 1.5 m, preferably less than 1.0 m. The apparatus according to the second aspect of the invention can also be realized with a compact structure. Such an apparatus can be used for the spectral broadening of laser pulses with pulse energies of the order of approximately 1 mJ or 10 mJ and pulse durations of, e.g., between 200 fs and 2 ps, while maintaining the beam quality. Together with the curvature of the nonlinear optical medium or exposed mirror surface of the end mirror and optionally the geometry of the mirror surface of the further optical element, the distance can be chosen such that a desired Gouy parameter of the apparatus is set.

A further aspect of the invention relates to an apparatus for the spectral broadening of laser pulses, comprising: a plurality of mirror elements, on each of which a mirror surface for reflecting the laser pulses is formed, the plurality of mirror elements being fastened to a main body, and also at least one preferably sheet-like, in particular disk-shaped nonlinear laser-active solid-state medium for amplifying the laser pulses, with the plurality of mirror elements forming a deflection device in the case of which the preferably planar mirror surfaces of the plurality of mirror elements are aligned such that the laser pulses are deflected from a respective mirror surface to another mirror surface via the disk-shaped laser-active solid-state medium, and with the main body and the disk-shaped laser-active solid-state medium being arranged in a housing filled with a gas with nonlinear optical properties, for the purposes of generating a nonlinear phase by self-phase modulation.

In this aspect of the invention, a disk-laser amplifier, for example as presented in US 2019/0173257 A1 cited above, is used as an apparatus for the broadening of laser pulses. For this purpose, a gas that serves to generate a nonlinear phase of the laser pulses by self-phase modulation has been introduced into the housing in which the laser pulses propagate. For example, the gas with nonlinear optical properties may be a noble gas, for example neon, argon or a mixture of a plurality of gas constituents. The provision of a nonlinear optical solid-state medium may optionally be dispensed with completely in this aspect of the invention.

In an embodiment, the mirror elements are securely connected to the main body via a respective connecting portion and/or the further mirror elements are securely connected to the further main body via a respective connecting portion, with cutouts preferably being formed in the main body and/or in the further main body, which cutouts each have a lateral surface for establishing a connection with the connecting portion of a respective mirror element or of a respective further mirror element. The mirror elements and the main body may be embodied for example as described in US 2019/0173257 A1, which is incorporated by reference in its entirety in the content of this application. As described there, the main body can be a sheet-like main body.

The main body and/or the mirror elements (typically with the exception of the nonlinear optical solid-state medium) are preferably made of glass, for example made of quartz glass, a glass ceramic or a metallic material, optionally an alloy. For the main body, the choice of a material substantially transparent to the laser pulses, for example in the form of glass, more particularly in the form of quartz glass, is advantageous in that this material hardly produces heat by absorption, especially in the case of laser pulses with wavelengths in the visible or near infrared wavelength range, and the main body therefore does not thermally deform. The joined, welded or adhesively bonded mirror elements therefore have a rigid alignment relative to one another and relative drifts are minimized.

The secure or permanent connection of the connecting portion to the main body can be an integral bond using a joining means, e.g., an adhesive connection and/or a soldered connection, or a direct connection without the use of a joining means. By way of example, the direct permanent connection can be a welded connection or a bonding connection. The mirror elements may have a one-piece embodiment or be monolithically joined. Should the sheet-like nonlinear optical solid-state medium be optically contact bonded to the surface, it is not permanently fastened to the surface of the mirror element, that is to say the mirror element as a whole (i.e., with the nonlinear optical solid-state medium) is not monolithically joined in this case. The main body is preferably formed in one piece but can also be monolithically joined.

The connecting portions of the mirror elements, which in particular may be formed rotationally symmetrically with respect to a center axis, are preferably inserted into the cutouts such that these adjoin a respective cutout at points, in lines or optionally extensively on the lateral surface. It is not mandatory for the cutouts to be set back in relation to the remaining main body. The cutouts may form perforations in the main body. The connecting portion of a respective mirror element may be in the form of a spherical segment and the spherical segment may be securely or permanently connected to the lateral surface of the cutout at a spherically curved surface of the spherical segment. Alternatively, the connecting portion may have a cylindrical form and preferably have a planar base area.

In a further embodiment, the nonlinear optical solid-state medium has a thickness of less than 1 mm, preferably of less than 500 µm. As described further above, it is advantageous for the apparatuses according to both aspects of the invention if use is made of a (transparent) nonlinear optical solid-state medium with a thin thickness.

By way of example, $SiO_2$, sapphire, YAG, $CaF_2$, $MgF_2$, . . . can be used as material for the nonlinear optical solid-state medium. These materials have a value of the nonlinear refractive index ($n_2$) that is suitable for the present application. Especially $CaF_2$ and $MgF_2$ have a small nonlinear refractive index, which allows higher pulse energies in the case of the same nonlinear phase deviation. It is understood that the nonlinear optical solid-state medium may also be formed from other materials to the ones described here.

A further aspect of the invention relates to an optical system comprising: a beam source for generating laser pulses or a pulsed laser beam, an apparatus for the spectral broadening of the laser pulses embodied as described above, and an apparatus for the temporal compression of the spectrally broadened laser pulses.

As described above, the apparatus for the spectral broadening of the laser pulses is typically used to reduce the pulse duration of the laser pulses by a factor of 10-20 with the aid of the downstream apparatus for temporal compression, with the pulse and beam quality largely being maintained. As described above, the apparatus described here for the spectral broadening of the laser pulses is advantageous in particular for shortening ultrashort laser pulses with pulse durations of between, e.g., 200 fs and 2 ps and in the case of pulse energies greater than or equal to 1 mJ, the laser pulses being produced by the beam source. By way of example, laser pulses with these pulse parameters can be produced by a beam source which has amplifier chains with coherently combined or individual fiber, rod, disk or slab amplifiers or regenerative amplifiers, for example based on disk lasers, or the combinations thereof.

The apparatus for the temporal compression of the laser pulses typically has one or more dispersive optical elements. The dispersive elements which can be used to compress the pulse duration of the laser pulses following their passage through the apparatus for spectral broadening may be, for example, chirped or dispersive mirrors (e.g., GTI (Gires-Tournois interferometer) mirrors), prism compressors or grating compressors.

To keep the spectral broadening of the laser pulses constant for the subsequent compression, the optical system may be embodied for closed-loop control of the pulse energy of the laser pulses that enter the apparatus for the spectral broadening of the laser pulses. To this end, the optical system may comprise at least one sensor, for example in the form of a photodiode, which measures the pulse energy of the laser pulses prior to entry into the apparatus for spectral broadening. The result of the measurement can be used by an open-loop and/or closed-loop control device to control the power of the radiation source in order to keep the pulse energy constant.

The optical system can also be designed to correct or keep constant the beam position of the laser pulses or the pulsed laser beam prior to the entry into the apparatus for the spectral broadening. For this purpose, the optical system can have one or more position-sensitive photodiodes (e.g., lateral effect diodes or segmented quadrant position detectors), cameras or combinations of these sensors. For controlling the input coupling of the laser pulses into the apparatus and for the mode adaptation (see below), it is advantageous if the beam size, in particular the beam diameter, on one or more mirrors in the beam path of the laser pulses is observed by one or more cameras prior to the entry into the apparatus or else within the apparatus, for example at or downstream of selected mirror surfaces.

In an embodiment, the optical system comprises an adjustment device for setting an in particular circular polarization state of the laser pulses input coupled into the apparatus for the spectral broadening of the laser pulses. It was found that the strength of the nonlinear phase generated during the self-phase modulation depends on the polarization state of the laser pulses. A circular polarization state of the laser pulses coupled into the apparatus may be advantageous for spectral broadening. Since the laser pulses upon emergence from the beam source are linearly polarized as a rule, a quarter wave retarder, for example a quarter wave plate, which—in the case of a suitable alignment of the preferred axis—converts the linear polarization state of the laser pulses into a circular polarization state can be used as an adjustment device for setting the circular polarization state. The circular polarization state of the spectrally broadened laser pulses can be converted into a linear polarization state by way of a further adjustment device, for example by way of a further quarter wave plate, at the output of the apparatus for the nonlinear spectral broadening. This is advantageous since the dispersive optical element or elements of the apparatus for temporal compression of the spectrally broadened laser pulses otherwise no longer work correctly.

In a further embodiment, the optical system comprises an adaptation device for adapting a beam caustic of the laser pulses input coupled into the apparatus for the spectral broadening to match a (transverse) eigenmode of the multipass cell. As generally conventional, the beam caustic is understood to mean the course of the transverse beam profiles along the optical propagation axis of the laser pulses. This beam caustic, in particular the diameter and the beam divergence or the opening angle, is adapted to match the (transverse) eigenmode of the multipass cell.

By simple means, the interaction length of the laser pulses with a nonlinear medium can be kept very long and the beam diameter can simultaneously be kept substantially unchanging or constant in controlled fashion in the case of multipass cells in the form of Herriott cells. A precondition for this is that the laser pulses (or the pulsed laser beam) entering into the apparatus or the multipass cell are adapted to match the equivalent transverse eigenmode of the Herriott cell within a certain tolerance.

The equivalent transverse eigenmode approximately is the transverse eigenmode that a Herriott cell would have if its end mirrors were configured as a closed resonator (all distances and curvatures of the mirror surfaces remained unchanged). However, this also yields a disadvantage of the Herriott cell, specifically that a desired mode and associated beam caustic are only achieved approximately by a few realizable combinations of radii of curvature of the end mirrors of the Herriott cell and number of round trips (i.e., the number of reflections at the end mirrors) in the Herriott cell.

The above-described disadvantages can be avoided by completely replacing both end mirrors of the Herriott cell or one of the end mirrors of the Herriott cell with a plurality of mirror elements. In particular, the number and the radii of curvature or alignment of the mirror surfaces of the mirror elements can be adapted or chosen in such a way that the number of round trips in the multipass cell can be chosen independently of the chosen transverse mode or beam caustic. Hence, the above-described multipass cell of the apparatus for the spectral broadening of the laser pulses technically no longer is a Herriott cell.

It is advantageous if the laser pulses are adapted to match the transverse mode of the multipass cell upon entry in the multipass cell in the case of the above-described multipass cell of the apparatus for the spectral broadening of the laser pulses. A mode adaptation device for adapting the beam profile of the laser pulses input coupled into the apparatus for spectral broadening may serve this purpose. By way of example, the mode adaptation device may comprise a beam telescope (mode adaptation telescope), a lens, a curved mirror, etc., in order to adapt the beam profile of the laser pulses or pulsed laser beam to match the eigenmode of the multipass cell before said laser pulses or pulsed laser beam enter the multipass cell. By way of example, the adaptation of the beam profile may comprise the adaptation of the beam cross section or beam diameter and/or the adaptation of the divergence of the pulsed laser beam or laser pulses.

A maladaptation of the pulsed laser beam upon entry in the multipass cell when attempting to match the eigenmode of the multipass cell generally leads to caustics along the beam path within the multipass cell that vary from round trip to round trip. This variation (breathing) can for example be characterized by the change in the beam diameter of the laser pulses on the respective mirror surfaces of the mirror elements of the main body or on the respective further mirror surfaces of the further mirror elements of the further main body which define the equivalent resonator. This change in the beam diameter has a minimum and a maximum over all round trips within the multipass cell.

Preferably, the optical system is designed to generate over all round trips a ratio between a maximum beam diameter of the laser pulses and a minimum beam diameter of the laser pulses on one of the end mirrors or at the mirror surfaces in the multipass cell, said ratio being less than 12, particularly preferably less than 6, and in particular less than 3. This is advantageous for guarding against damage to the optical units as a result of intensities that are too high. Such a ratio or such a factor for the ratio of maximum beam diameter to minimum beam diameter can be set or generated with the aid of the above-described mode adaptation device, for example. The ratio between the maximum beam diameter and the minimum beam diameter may be significantly greater than 12 between the mirror surfaces or the optical units of the multipass cell, for example the laser pulses can be focused at a focal position where the beam diameter is very small.

Further advantages of the invention are evident from the description and the drawing. Similarly, the features mentioned above and those still to be further presented can be used in each case individually or together in any desired combinations. The embodiments shown and described should not be understood as an exhaustive enumeration, but rather are of an exemplary character for outlining the invention.

In the following description of the drawings, identical reference signs are used for identical or functionally identical components.

Figure 1B:
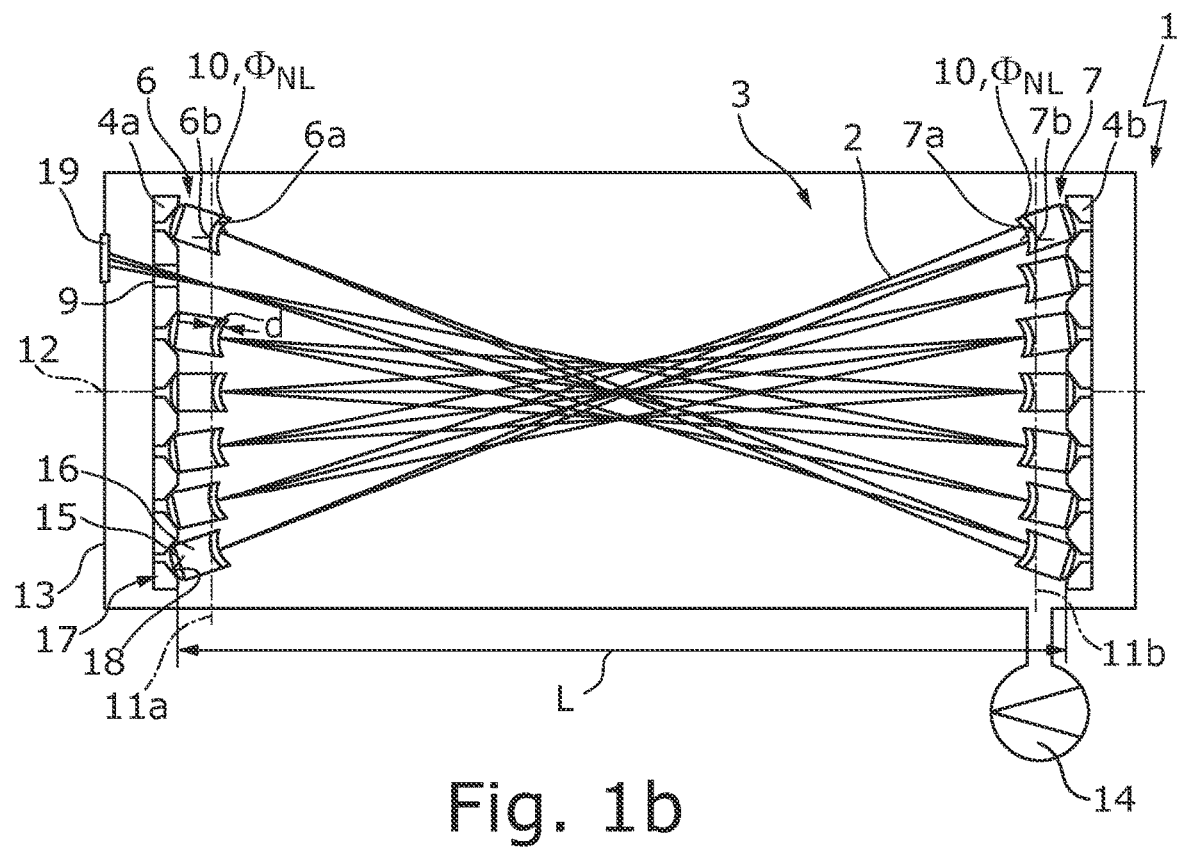

FIGS. 1a and 1b show an exemplary structure of an apparatus 1 for the spectral broadening of laser pulses 2, the beam profile of which has been represented by solid lines for the sake of simplifying representation. The apparatus 1 comprises a multipass cell 3 which has a sheet-like main body 4a and a further sheet-like main body 4b, between which the laser pulses 2 are reflected back and forth multiple times.

For this purpose, a total of twelve mirror elements 6 have been fastened to the main body 4a and a total of thirteen further mirror elements 7 have been fastened to the further main body 4b. The mirror elements 6 and the further mirror elements 7 are respectively arranged in a circle 8 on the main body 4a and the further main body 4b. It is understood that the mirror elements 6 and the further mirror elements 7 may also be arranged in two or more circles. The further mirror elements 7 are arranged equidistantly in the circumferential direction along the further main body 4b. The same applies to the mirror elements 6, with a through hole 9 being formed in the main body 4a in place of the thirteenth mirror element and the laser pulses 2 being input coupled into and subsequently output coupled from the interstice between the main body 4a and the further main body 4b. Instead of the through hole 9, an optical element may also be arranged in the interstice between the main body 4a and the further main body 4b for the input and output coupling of the laser pulses 2 into and from the multipass cell 3, respectively.

A respective mirror element 6 has a surface 6a and a respective further mirror element 7 has a surface 7a, fastened to each of which is a sheet-like nonlinear optical solid-state medium 10 for generating a nonlinear phase $\Phi_{NL}$ by self-phase modulation. By way of example, the solid-state medium 10 can be formed from $SiO_2$, sapphire, YAG, $CaF_2$, $MgF_2$, . . . . In the example shown, the solid-state medium 10 is curved, with the curvature of the solid-state medium 10 being adapted to match the concave curvature of the surface 6a, 7a of the respective mirror element 6 or the respective further mirror element 7. The respective solid-state medium 10 is extensively fastened to the concavely curved surface 6a, 7a of the respective mirror element 6 or of the respective further mirror element 7 by way of a back side that has been adapted in terms of curvature and faces the curved surface 6a, 7a of the respective mirror element 6 or of the respective further mirror element 7. On its side facing the concavely curved surface 6a, 7a, the sheet-like solid-state medium 10 has a reflective coating which forms the—likewise concavely curved—mirror surface 6b, 7b of the mirror element 6 or of the further mirror element 7.

In the example shown in FIGS. 1a and 1b, the respective sheet-like solid-state medium 10 is adhesively bonded to the surface 6a, 7a but it can also be connected to the surface 6a, 7a using any other integral connection, for example by way of a (glass) solder. A direct, permanent connection between the solid-state medium 10 and the surface 6a, 7a of the respective mirror element 6 or of the respective further mirror element 7 is also possible, for example a bonding connection or a welded connection. The solid-state medium 10 may optionally also be fastened to the surface 6a, 7a of the respective mirror element 6 or of the respective further mirror element 7 by way of a detachable connection, for example by optical contact bonding.

To fulfill the functionality of a conventional multipass cell 3, all mirror surfaces 6b have the same spherical curvature or the same radius of curvature and are located along an annulus 11a of a spherical surface which is indicated by a dashed line in the sectional illustration of FIG. 1b and which runs through all mirror surfaces 6b of the annulus. Accordingly, all further mirror surfaces 7b have the same spherical curvature or the same radius of curvature and are arranged along a further annulus 11b of a further spherical surface likewise indicated in FIG. 1b by a dashed line. The main body 4a and the further main body 4b are arranged at a distance L from one another, which is less than 1.5 m, more precisely approximately 1 m, in the example shown.

On account of the Kerr lens of the respective solid-state media 10, the radius of curvature of the mirror surfaces 6b and the further mirror surfaces 7b and the thickness of a respective solid-state medium 10 may each be adapted or (slightly) corrected on the basis of the position of a respective mirror element 6 or a respective further mirror element 7—deviating from the illustration in FIG. 1b—in order to compensate the Kerr lens. What this can achieve is that the effective radius of curvature of the mirror surfaces 6b and of the further mirror surfaces 7b remains constant when taking account of the Kerr lens and optionally taking account of further nonlinear effects.

As is conventional for multipass cells or Herriott cells, the distance L and the radius of curvature R are matched to one another in such a way that this leads to a desired number of reflections within the multipass cell 3. The mirror elements 6 or further mirror elements 7 mounted along a respective annulus in the example shown each point approximately in the direction of the center axis of the multipass cell 3, which is aligned perpendicular to the main body 4a and the further main body 4b. A respective mirror element 6 on the main body 4a is aligned relative to the center axis such that a respective further mirror element 7 on the further main body 4b is struck by the laser pulses 2 so that the caustic profile depicted in FIGS. 1a and 1b arises. The number of reflections depends in terms of geometry on the annulus along which the mirror elements 6 or the further mirror elements 7 are mounted, the distance between the mirror elements 6 and the further mirror elements 7, and their size.

The radius of curvature R of the concavely curved mirror surfaces 6b and of the further mirror surfaces 7b, respectively, depends on whether the multipass cell is operated in the style of a concentric resonator, or whether (quasi) collimated laser pulses 2 are used. In the first case, it is advantageous if the radius of curvature R of the mirror surfaces 6b and of the further mirror surfaces 7b, respectively, is between 1 m and 15 m while it is advantageous in the second case if the radius of curvature R is less than approximately 1000 m and more than approximately 10 m, in particular more than 20 m. In the second case, it is advantageous if the overall optical power, that is to say the sum of the optical powers of the mirror surfaces 6b of all mirror elements 6 and the optical powers of the further mirror surfaces 7b of all further mirror elements 7, is between 5 $m^{-1}$ and infinity $m^{-1}$.

The use of comparatively large radii of curvature R of the mirror surfaces 6b and of the further mirror surfaces 7b was found to be advantageous since no intermediate foci are required. The thickness d of a respective solid-state medium 10, which is constant in the example shown, should not be chosen to be too large in order to prevent catastrophic self-focusing during the nonlinear spectral broadening of laser pulses 3 with high pulse energies of the order of, e.g., 100 mJ or more. The thickness d of the respective solid-state medium 10 should typically be less than approximately 1 mm or 500 μm in the case of pulse energies of the order of mJ or more.

Additionally, it is advantageous to reduce the pressure of the gas present in the multipass cell 3 to for example less than approximately 100 mbar in order to prevent an ionization of the gas, which would have as a consequence a deterioration in the quality of the temporal compression of the pulse durations of the laser pulses 2 which follows the spectral broadening. As is evident from FIG. 1b, the multipass cell 3 is arranged in a housing 13 that is connected to a pump device 14 in the form of a vacuum pump, in order to set a desired pressure in the interior of the housing 13 or in order to evacuate the housing 13.

As is likewise evident from FIG. 1b, the mirror elements 6 are permanently connected to the main body 4a via a respective connecting portion 15, which forms a spherical segment in the example shown. In the case of the mirror elements 6, the connecting portion 15 is adjoined by a cylindrical portion 16, the end face of which forms the concavely curved surface 6a, to which the sheet-like, curved solid-state medium 10 is fastened. The connecting portion 15 in the form of the spherical segment of a respective mirror element 6 is inserted in a cutout 17 of the main body 4a and abuts against a lateral surface 18 of the cutout 17. The lateral surface 18 can be a conical surface, a spherical surface or a free-form surface. In the example shown, the secure or permanent connection is realized as an adhesive connection, but can also be produced in any other way. The connecting portion 15 or the permanent connection to the main body 4a may also be realized in any other way, for example as described in US 2019/0173257 A1 cited above. The further mirror elements 7 are fastened or connected to the further main body 4b in analogous fashion.

The side view shown in FIG. 1b was chosen as a simplified representation, in which the mirror elements 6 and the further mirror elements 7 are in each case depicted equidistantly, for the sake of a better overview. In reality, the mirror elements 6 or further mirror elements 7 located on a circle are arranged at different distances from one another in the side view. In reality, the mirror elements 6 and the further mirror elements 7 at the upper edge and at the lower edge of the representation of FIG. 1b, in particular, partially overlap in a real side view.

The secure, permanent connection of the mirror elements 6 or further mirror elements 7 to the respective sheet-like main body 4a, 4b makes it possible to prevent a deadjustment of the mirror elements 6 or further mirror elements 7 during the operation of the apparatus 1, that is to say the latter has sufficient robustness for industrial application. Moreover, the apparatus 1 or the multipass cell 3 can be realized with a short installation length L.

As described further above, the spectrally broadened laser pulses 2 output coupled via a window 19 provided in the housing 13 are, in an apparatus for the temporal compression of the pulse duration, shortened by a factor of 10-20, for example, in relation to the pulse duration of the laser pulses 3 input coupled into the apparatus 1 via the window 19, the laser pulses 3 being produced by a beam source (not depicted here) and for example being able to have a pulse duration of approximately 1 ps. The apparatus for the temporal compression of the laser pulses may have one or more dispersive optical elements, for example.

Figure 2A:
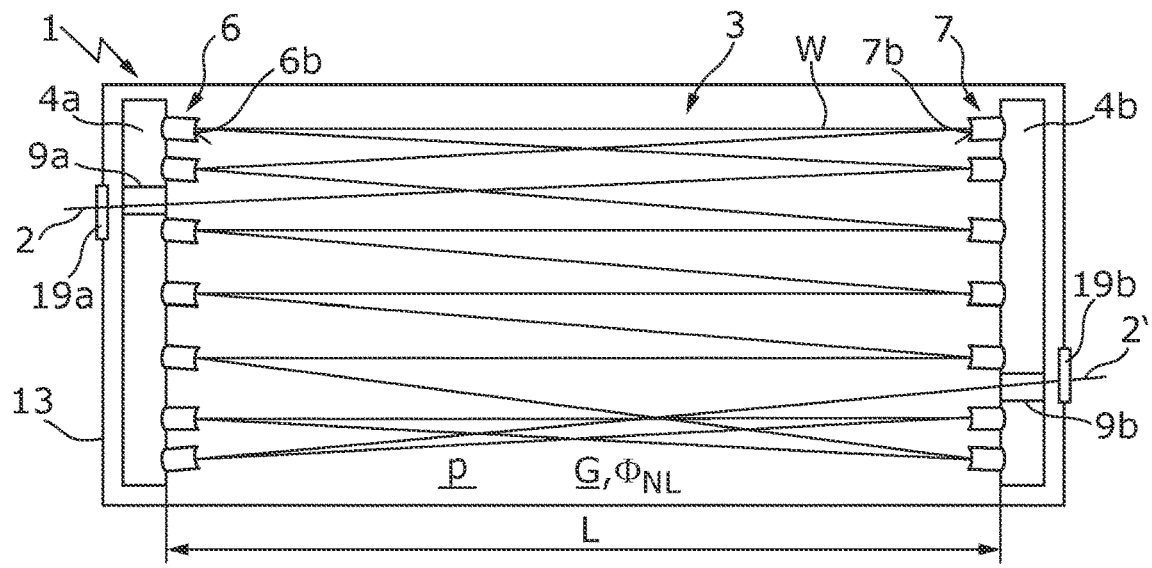
FIGS. 2a and 2b show schematic representations of an apparatus for the spectral broadening of laser pulses with the aid of a gaseous nonlinear medium with a multipass cell in a manner analogous to FIGS. 1a and 1b.
Figure 2B:
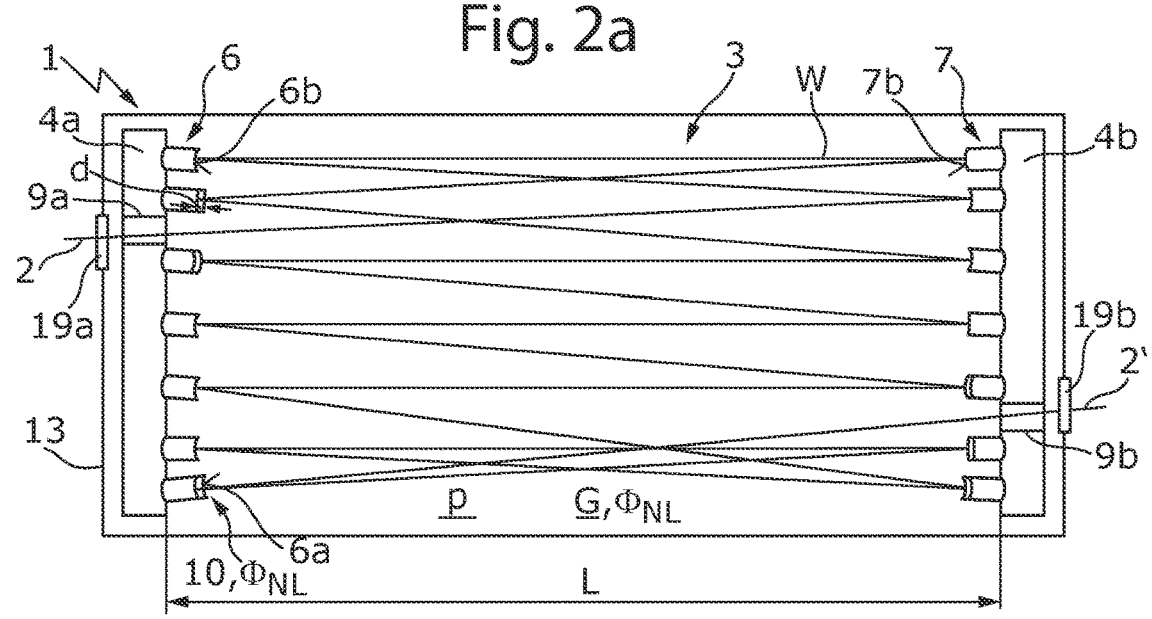

FIGS. 2a and 2b show an apparatus 1 for the spectral broadening of laser pulses, essentially designed as depicted in FIGS. 1a and 1b. The apparatus 1 comprises a main body 4a, to which a plurality of mirror elements 6 have been fastened, and a further main body 4b, to which a plurality of further mirror elements 7 have been fastened. In contrast to the example shown in FIGS. 1a and 1b, the housing 13 in which the multipass cell 3 is arranged is filled with a gaseous nonlinear optical medium G, which generates the nonlinear phase of the laser pulses 2, in the examples shown in FIGS. 2a and 2b. In the example shown, the gaseous nonlinear optical medium G is a noble gas. However, in principle, other gases or gas mixtures may also serve as nonlinear optical solid-state media, for example other diatomic gases such as nitrogen, or gas mixtures, e.g., air.

Unlike the apparatus 1 shown in FIGS. 1a and 1b, the apparatuses 1 shown in FIGS. 2a and 2b have no pump device 14 for evacuating the housing 13, even though the use of such a pump device 14 is possible in principle. The housing 13 is sealed in gas-tight fashion, is pressure-tight and has an entrance window 19a for the entrance of the laser pulses 2 into the housing 13 and an exit window 19b for the emergence of the laser pulses 2 from the housing 13. The laser pulses 2 entering the housing 13 via the entrance window 19a enter the multipass cell 3 via a through hole 9a in the main body 4a. A further through hole 9b in the further main body 4b serves for the passage of the spectrally broadened laser pulses 2' from the multipass cell 3, which spectrally broadened laser pulses emerge from the housing 13 via the exit window 13b.

The apparatuses 1 shown in FIGS. 2a and 2b have components (not depicted here) in the form of controllable inlet and outlet valves for the inlet of the gaseous nonlinear optical medium G into the housing 13 and for the outlet of the gaseous nonlinear optical medium G from the housing 13, respectively. A gas pressure p can be set in the housing 13 with the aid of the inlet and outlet valves. The gas pressure of the nonlinear optical medium G or the overall pressure p in the housing 13 may for example range between 50 mbar and 10 bar. The overall pressure p may be adjustable over the entire pressure range, but this is not mandatory. It is possible for a gas pressure sensor to be arranged in the housing 13 if the gas pressure p in the housing 13 is intended to be controlled, said gas pressure sensor being connected to a closed-loop control device in order to keep the gas pressure p in the housing 13 at a target gas pressure.

In the case of the apparatus 1 shown in FIG. 2a, all of the mirror surfaces 6b of the mirror elements 6 and all of the further mirror surfaces 7b of the further mirror elements 7 are exposed, that is to say none of these have a nonlinear solid-state medium 10 fastened thereto, unlike what is the case in the apparatus shown in FIGS. 1a and 1b. Consequently, the nonlinear phase $\Phi_{NL}$ of the laser pulses 2 is generated purely by the gaseous nonlinear optical medium G in the example shown in FIG. 2a. In the case of the apparatus 1 shown in FIG. 2a, the mirror surfaces 6b of the mirror elements 6 and the further mirror surfaces 7b of the further mirror elements 7 are concavely curved, as is also the case for the apparatuses 1 shown in FIGS. 1a and 1b.

In the case of the apparatus 1 shown in FIG. 2b, a first group of mirror surfaces 6b of the mirror elements 6 and a first group of the further mirror surfaces 7b of the further mirror elements 7 have concave curvature, a second group has convex curvature and a third group has a planar embodiment. The curvature of the mirror surfaces 6b or further mirror surfaces 7b consequently varies along the beam path W of the laser pulses 2 and can be used to suitably set the nonlinear phase $\Phi_{NL}$ of the laser pulses 2.

In the case of the apparatus 1 shown in FIG. 2b, the nonlinear phase $\Phi_{NL}$ of the laser pulses 2 is not generated solely by the gaseous nonlinear medium G, rather a respective nonlinear sheet-like solid-state medium 10 is fastened to selected surfaces 6a of the mirror elements 6 and to selected surfaces 7a of the further mirror elements 7. As is evident from FIG. 2b, a distance (i.e., the length of a section of the beam path W) in this case reduces between in each case two adjacently arranged nonlinear optical solid-state media 10 in the beam path W of the laser pulses 2 in the apparatus 1 or in the multipass cell 3 as length of the beam path W of the laser pulses 2 in the multipass cell 3 increases (starting from the entrance of the laser pulses 2 into the multipass cell 3). Within the meaning of this application, the reduction in the distance between in each case two adjacent solid-state media 10 in the beam path also includes the case where the distance between three successive solid-state media 10 in the beam path W remains substantially constant, as is the case in the third, fourth and fifth nonlinear optical solid-state medium 10 depicted in FIG. 2b. A requirement for meeting the condition that the distance (the length of a section of the beam path W) between in each case two adjacent solid-state media in the beam path W decreases with increasing length of the beam path W is that, however, there is a reduction in the distance for at least three successive solid-state media 10 in the beam path W within the multipass cell 3, as is the case for the first, second and third solid-state medium 10 in the beam path W.

In the case of the apparatus 1 shown in FIG. 2b, the thickness d of a respective nonlinear solid-state medium 10 increases with increasing length of the beam path W of the laser pulses 2 in the multipass cell 3, that is to say the first solid-state medium 10 in the beam path W has the smallest thickness d and the last, sixth solid-state medium 10 in the beam path W has the greatest thickness. As a result of the increasing thickness d of the solid-state media 10, the nonlinear phase $\Phi_{NL}$ collected along the beam path also increases to a greater extent with increasing length of the beam path W than what would be the case for a constant thickness d of the solid-state media 10.

It is understood that the use of nonlinear optical solid-state media 10 shown in FIG. 2b is also possible for the apparatus 1 shown in FIG. 2a. It is likewise possible for the apparatus 1 shown in FIG. 2b to have no nonlinear optical solid-state media 10 but purely the gaseous nonlinear medium G.

Figure 3:
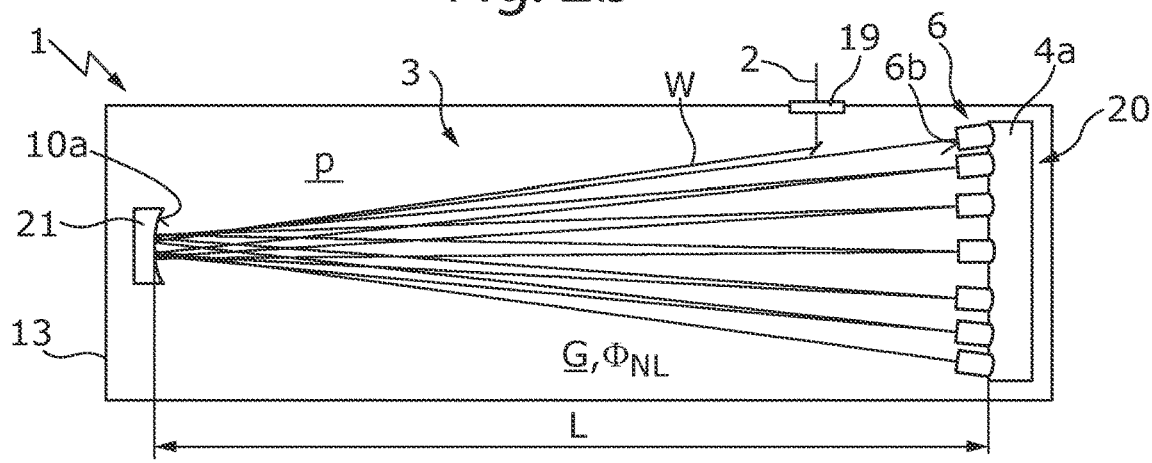
FIG. 3 shows a schematic representation of an apparatus for the spectral broadening of laser pulses with the aid of a gaseous nonlinear medium, comprising a deflection device with a plurality of mirror elements for deflecting the laser pulses to an exposed mirror surface of an end mirror.

FIG. 3 shows an apparatus 1 which differs from the apparatuses 1 shown in FIGS. 1a and 1b and FIGS. 2a and 2b in that there is only one main body 4a with a plurality of mirror elements 6 with mirror surfaces 6b, which have a planar geometry in the example shown. Instead of the further main body 4b, an end mirror 21 with a concavely curved, exposed mirror surface 10a is arranged in the housing 13 in the apparatus shown in FIG. 3. The end mirror 21 has a monolithic form and a significantly smaller diameter than the main body 4a, to which the plurality of mirror elements 6 have been fastened. Like in the case of the apparatus 1 shown in FIG. 2a, the nonlinear phase $\Phi_{NL}$ is generated purely by a gaseous nonlinear optical medium G in the case of the apparatus 1 shown in FIG. 3.

In the case of the apparatus 1 shown in FIG. 3, the main body 4a with the plurality of mirror elements 6 forms a deflection device 20. The deflection device 20 serves to reflect the laser pulses 2, which have been radiated into the housing 13 through a window 19 and which have been deflected to the mirror surface 10a of the end mirror 21 via a deflection mirror, back to the mirror surface 10a of the end mirror 21 multiple times. As is evident from FIG. 2a, the deflection device 20 and the exposed mirror surface 10a are arranged at a given distance L from one another in order to form a multipass cell 3, the distance L being measured at the center of the mirror surface 10.

In the example shown, the deflection device 20 is designed such that the laser pulses 2 are retroreflected at one of the planar mirror surfaces 6b such that these emerge from the housing 13 of the multipass cell 3 via the window 19 following the spectral broadening. It is understood that, alternatively, a separate entrance window 19a and exit window 19b may be provided in the housing 13, as in the case of FIGS. 2a and 2b. A nonlinear optical solid-state medium 10 may also be fastened to the end mirror 21 in place of the exposed surface 10a, as is described below. In this case, it is not necessary for a gaseous nonlinear medium G to be introduced into the multipass cell 3.

Figure 4:
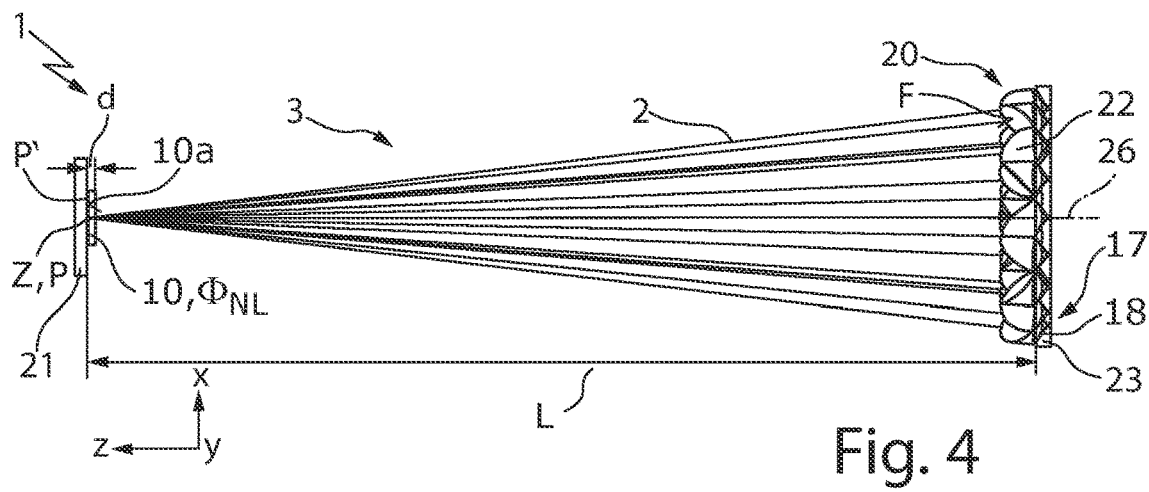
FIG. 4 shows a representation of an example of an apparatus for the spectral broadening of laser pulses, comprising a deflection device with a plurality of mirror elements for deflecting the laser pulses to a sheet-like nonlinear optical solid-state medium.

FIG. 4 shows an example of an apparatus 1 for the spectral broadening of laser pulses 2, which comprises a deflection device 20 and a disk-shaped laser-active solid-state medium 10, referred to as solid-state medium 10 below, for producing a nonlinear phase $\Phi_{NL}$ of the laser pulses 2 by self-phase modulation. The solid-state medium 10 is fastened to a support body 21 and mirrored on its side facing the support body 21, that is to say the solid-state medium 10 has a mirror surface 10a for reflecting laser pulses 2 to be spectrally broadened, which strike the solid-state medium 10 from the deflection device 20, back to the deflection device 20 such that the solid-state medium 10 is passed multiple times by the laser pulses 2, and broadened in the process. On its side facing away from the support body 21, the solid-state medium 10 may have an antireflection coating or antireflecting microstructuring. In the example shown, the support body 21 is in the form of a heatsink. Alternatively, the heatsink or an additional heatsink can be fastened to the support body 21. Together, the solid-state medium 10 and the deflection device 20 form a multipass cell 3, as described in conjunction with FIG. 3.

Figure 5A:
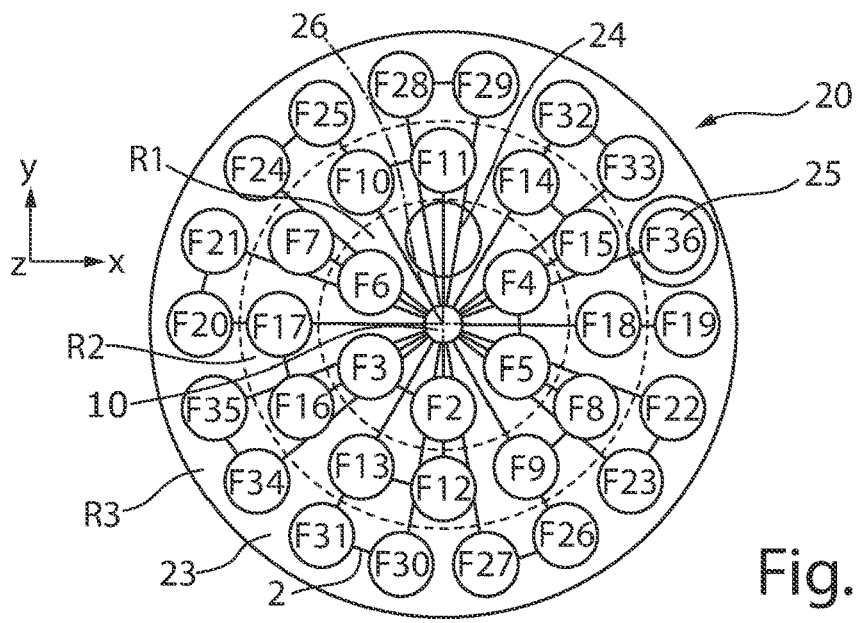
FIGS. 5a and 5b show schematic representations of mirror surfaces of the mirror elements, arranged on three annuli or on an annulus and two rings with different radial distances from a center axis.
Figure 5B:
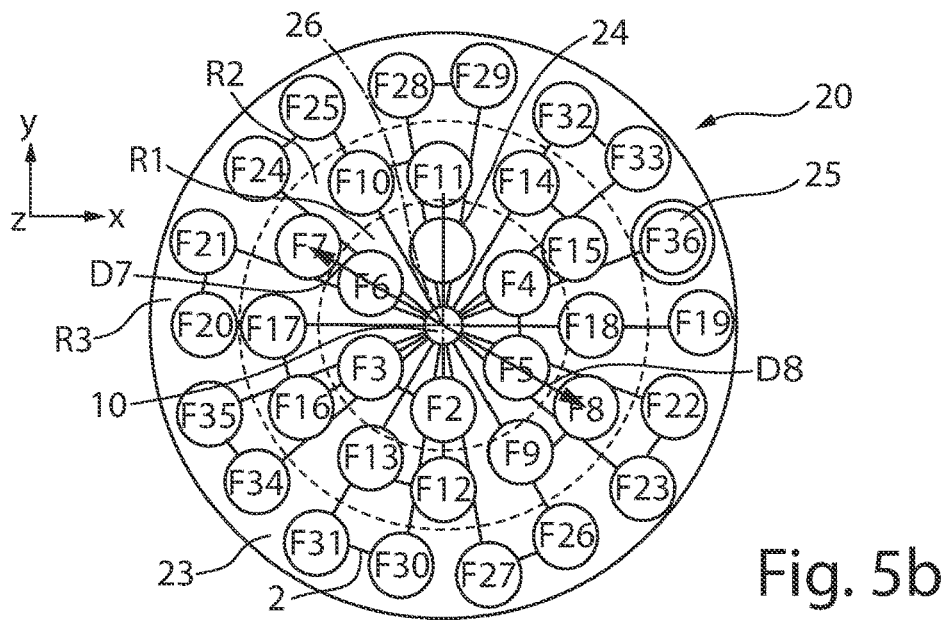

To enable such a multiple passage through the solid-state medium 10, the laser pulses 2 are deflected by mirror elements 22, which are formed on the deflection device 20, in the form of deflection mirrors, specifically at their (planar) mirror surfaces F2 to F35 (cf. FIGS. 5a and 5b). It is understood that the deflection device 20 may also have fewer or more mirror elements 22 or mirror surfaces (see below). The mirror elements 22 are fastened to a sheet-like main body 23 of the deflection device 20 with the aid of a monolithic construction technique, as was described above in the context of FIGS. 1a and 1b. The sheet-like main body 23 is aligned parallel to the XY-plane of an XYZ-coordinate system and aligned parallel to the disk-shaped solid-state medium 10.

As is evident from FIGS. 5a and 5b, the laser pulses 3 which are generated by a pulsed laser source (not shown) pass through the sheet-like main body 23 via a passage opening 24 and, in the process, are aligned such that they strike the solid-state medium 10 centrally and are reflected there, more specifically at its mirrored back-side mirror surface 10a, to a second mirror surface F2. The laser pulses 2 emanating from the solid-state medium 10 are deflected or reflected directly at the second mirror surface F2 to a third, adjacent mirror surface F3. The third mirror surface F3 is aligned relative to the solid-state medium 10 such that the laser pulses 2 are once again deflected or reflected to the solid-state medium 10 from the third mirror surface F3. At the solid-state medium 10, the laser pulses 3 are deflected to a fourth mirror surface F4, and are reflected from the latter directly to a fifth mirror surface F5, etc.

In the case of the deflection devices 20 shown in FIGS. 5a and 5b, the deflection of the laser pulses 2 consequently alternates between the solid-state medium 10 and a respective pair of mirror surfaces F2, F3; F4, F5; F5, F6; . . . , F34, F35 arranged adjacently in the shown example. The beam path of the laser pulses 2 between the solid-state medium 10 and the mirror surfaces F2, F3; F4, F5; F5, F6; . . . , F34, F35, more precisely the projection thereof into the XY-plane, is likewise depicted in FIGS. 3a and 3b. In the case of the examples shown in FIGS. 3a and 3b, the deflection devices 20 each have an end mirror 25, the mirror surface F36 of which is aligned perpendicular to the laser pulses 2 striking the mirror surface F36 of the end mirror 25 such that the laser pulses 2 are reflected back (onto themselves) to the solid-state medium 10 and the beam path through the deflection device 20 is run through a second time with a reversed propagation direction. It is understood that a further passage opening may be provided in the deflection device 20 in place of the end mirror 25, in order to output couple the laser pulses 2 from the apparatus 1 without these laser pulses running through the deflection device 20 again, or that a deflection mirror may be provided, which output couples the laser pulses 2 from the apparatus 1.

In the case of the deflection device 20 shown in FIG. 5a, the mirror elements 22 are arranged in a circular pattern, more precisely in three annuli R1, R2, R3 concentrically about a center axis 26 of the sheet-like main body 7 that extends in the Z-direction. The radial distances between the mirror elements 22 arranged in a respective annulus R1, R2, R3 are the same such that the laser pulses 2 strike the solid-state medium 10 or the mirror surface 10a at a point of incidence P, which is located at the center Z of the disk-shaped solid-state medium 10, through which the center axis 26 also passes.

In the case of the deflection device 20 shown in FIG. 5b, the mirror elements 22 are likewise arranged in a substantially circular pattern in three annuli R1, R2, R3 in concentric fashion about the center axis 26. While the mirror elements 22 are arranged at the same radial distance from the center axis 26 in the first, innermost annulus R1, the mirror elements 22 in the second and the third annulus R2, R3 are slightly offset from one another in the radial direction. By way of example, this applies to the seventh mirror surface F7 and to the eighth mirror surface F8, which are both located within the second annulus R2, but in the case of which a radial distance D7 of the seventh mirror surface F7 from the center axis 26 is less than a radial distance D8 of the eighth mirror surface F8 from the center axis 26. As a result of the different radial distances D7, D8, the laser pulses 2 do not strike a point of incidence P at the center Z of the disk-shaped solid-state medium 10, instead striking a point of incidence P' radially offset from the center Z. A corresponding statement applies to the other mirror surfaces F9 to F35, which are arranged in the second and in the third annulus R2, R3 and which serve to let the laser pulses 2 strike the solid-state medium 10 at different points of incidence P' that are offset from the center Z in each case.

The laser pulses 2 striking the solid-state medium 10 at different points of incidence P, P' is advantageous in view of reducing the risk of damage by the laser pulses 2, which typically have pulse energies of the order of approximately 10 mJ or more. It is understood that the mirror elements 22 of the deflection device 20 may also be arranged differently, for example in an arrangement in the form of polygons, for example in the form of a pattern of hexagons.

To prevent defocusing of the laser pulses 2 passing through the deflection device 20, the solid-state medium 10, and hence also the mirror surface 10a, is slightly concavely curved, with the radius of curvature R being of the order of between 20 m and 100 m, depending on the respective Kerr lens. Additionally, a distance L between the solid-state medium 10, more precisely the mirror surface 10a, and the sheet-like main body 20 can be chosen during the construction of the apparatus 1 such that the Gouy parameter adopts a desired value. The distance L between the solid-state medium 2 or its mirror surface 10a and the sheet-like main body 23 is less than 1.5 m, more particularly less than 1.0 m, in the example shown.

Figure 6A:
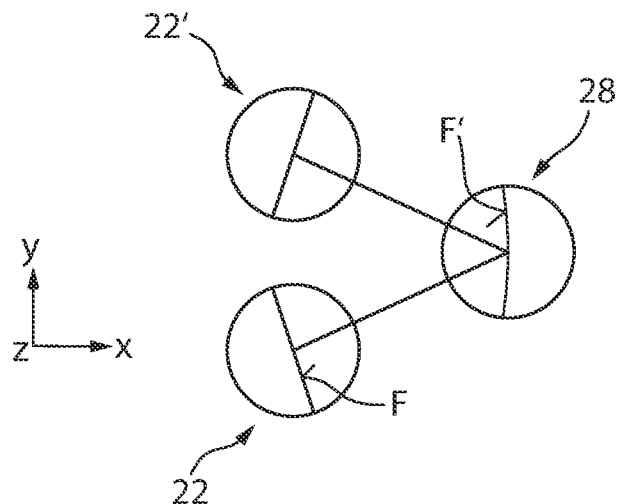
FIGS. 6a and 6b show schematic representations of two mirror elements of the deflection device and of a further mirror element of the deflection device with a curved mirror surface.
Figure 6B:
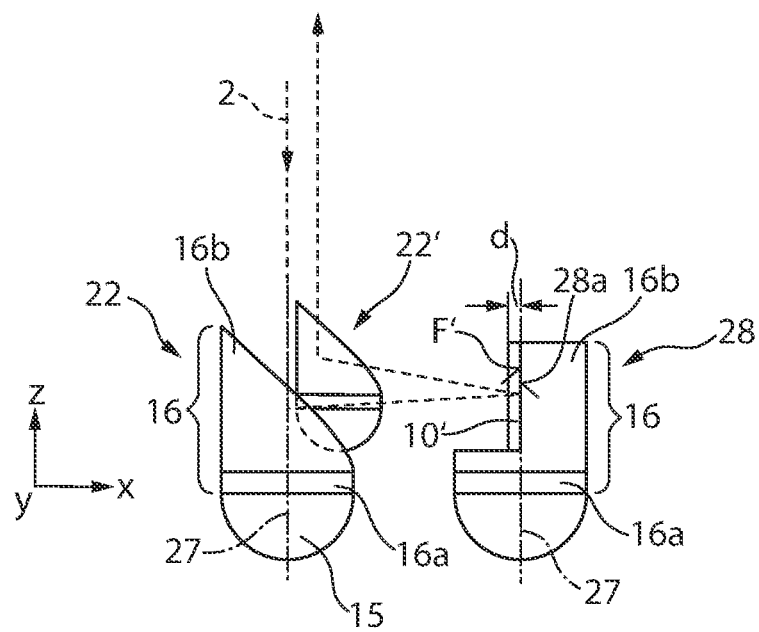

In the case of the examples shown in FIGS. 5a and 5b, the deflection between the mirror surfaces F2, F3; F4, F5; F6, F7; . . . of adjacent mirror elements 22 of a respective annulus R1, R2, R3 is implemented directly, to be precise substantially in the azimuthal direction or circumferential direction. In this case, the respective planar mirror surface F is aligned at an angle of approximately 45° with respect to a center axis 27 of the respective mirror element 22, 22', as indicated in FIGS. 6a and 6b. However, the deflection is not directly between two adjacently arranged mirror elements 22, 22' in the example shown in FIGS. 4a and 4b; rather, the laser pulses 2 are deflected from a first mirror element 22 to a further mirror element 28, which has a curved mirror surface F'. The laser pulses 2 are deflected or reflected to the second mirror element 22' at the curved mirror surface F'. The further mirror element 28 differs from the other mirror elements 22, 22' of the deflection device 20, firstly by way of the curvature of the mirror surface F' and secondly by way of the alignment of the mirror surface, which is aligned parallel to the center axis 27 of the further mirror element 28 in the example shown, that is to say at an angle of virtually 0° with respect to the center axis 27. This is how the deflection is implemented between the two mirror elements 22, 22', (approximately) in the XY-plane perpendicular to the center axis 27 which corresponds to the Z-direction of the XYZ-coordinate system.

The curved mirror surface F' can be a spherically curved surface, but also an aspherical surface or a free-form surface. By choosing the curvature of the mirror surface F' of the further mirror element 28, it is possible in addition to the choice of curvature of the disk-shaped solid-state medium 10 to influence the Gouy parameter and set the latter to a desired value. As is evident from FIG. 6b, a further sheet-like or disk-shaped nonlinear solid-state medium 10' is fastened to a surface 28a of the further mirror element 28, to be precise in the manner described above in conjunction with FIG. 1b. Like the thickness d of the disk-shaped solid-state medium 10, the thickness d of the further solid-state medium 10' is less than 500 μm in order to avoid catastrophic self-focusing.

As may likewise be identified in FIG. 6b, the mirror elements 22, 22' and the further mirror element 28 are formed as described above in the context of FIG. 1b, that is to say these have a connecting portion 15 that is formed rotationally symmetrically with respect to the center axis 27 and forms a spherical segment, in order to connect the mirror elements 22, 22' and the further mirror element 28 to the sheet-like main body 23. The connecting portion 15 is adjoined by a cylindrical portion 16, which is subdivided into a solid cylindrical portion 16a and a prismatic portion 16b or a stepped portion 16b. The planar mirror surface F forms a section through the prismatic portion 16b of the respective mirror element 22, 22' in the form of an elliptic surface. In order to generate a focusing or defocusing effect, use may optionally also be made of a curved mirror surface F, for example a parabolically curved mirror surface F, instead of a planar surface.

The connecting portion 15 of a respective mirror element 22 is permanently fastened to a cutout 17 (cf. FIG. 2) on the sheet-like main body 23 as described in the context of FIG.

1b, to be precise it is adhesively bonded to a lateral surface 18 of a respective cutout 17 in the example shown. The apparatus 1 described in the context of FIG. 2 also has high robustness as a result of the monolithic construction technique. By way of example, the mirror elements 22, 22' shown in FIGS. 4a and 4b might be two adjacent mirror elements of the second annulus R2, while the further mirror element 28 is arranged in the circumferential direction between the two mirror elements 22, 22' on the third annulus R3.

Figure 7:
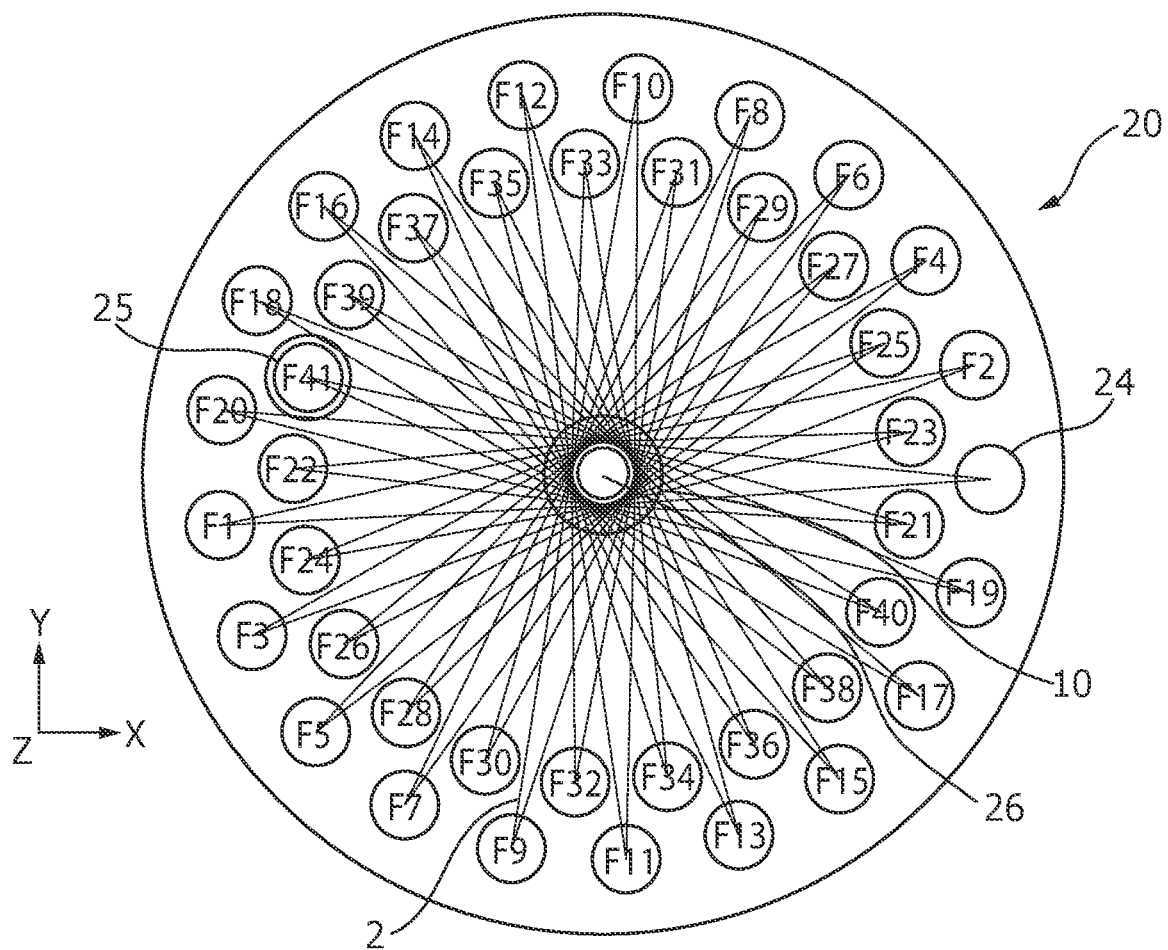
FIG. 7 shows a schematic representation of mirror surfaces of the mirror elements of the deflection device, which are arranged on two rings with different radial distances from the center axis and at which the laser pulses are reflected directly back to the nonlinear optical solid-state medium.

FIG. 7 shows a further example of a deflection device 20 having a plurality of mirror elements 22 with respective mirror surfaces F1 to F41 in a representation analogous to FIGS. 3a and 3b. The mirror elements 22 are connected to the sheet-like main body 23 with the aid of the above-described monolithic construction technique. In contrast to the example shown in FIGS. 5a and 5b, the laser pulses 2 are deflected from a respective mirror surface F1, F2, . . . to a next mirror surface F2, F3, . . . in the beam path only by way of the nonlinear optical solid-state medium 10 in the case of the deflection device 20 shown in FIG. 7. Expressed differently, a respective mirror element 22 has a mirror surface F1, F2, . . . which is planar in the example shown and which is aligned in such a way that the laser pulses 2 which strike the respective mirror surface F1, F2, . . . from the nonlinear optical solid-state medium 10 are directly reflected back to the nonlinear optical solid-state medium 10 from the respective mirror surface F1, F2, . . . . Like in the example illustrated in FIG. 5b, the mirror elements 22 of FIG. 7 are slightly offset from one another in the radial direction in order to cause the laser pulses 2 to strike the disk-shaped nonlinear optical solid-state medium 10 in an annulus around the center or around the center axis 26 of the main body 23.

In contrast to the mirror elements 22 depicted in FIG. 4 and in FIGS. 5a and 5b, the mirror surfaces F1, F2, . . . of the mirror elements 22 in FIG. 7 are not aligned at an angle of 45° with respect to the respective center axis 27 (not depicted here) of the mirror element 22 but are perpendicular thereto (this is also referred to as a 0° mirror even if the angle is only approximately 0°). The deflection of the laser beam 2 from and to the disk-shaped nonlinear optical solid-state medium 10 is achieved by aligning the center axes 27 of the respective mirror elements 22 at a suitably chosen angle with respect to the center axis 26 of the main body 23. With the aid of the deflection device 20 shown in FIG. 7, a greater number of passages through the nonlinear optical solid-state medium 10 can be achieved using the same installation space than in the case of the deflection devices 20 depicted in FIGS. 5a and 5b.

With the aid of the apparatus 1 shown in FIG. 4, it is also possible to broaden laser pulses 2 with high pulse energies of approximately 10 mJ or more, without the pulse quality deteriorating in the process. Since the apparatus 1 shown in FIG. 4 makes do without intermediate foci, it may optionally be possible to dispense with an evacuation. Should the pressure in the apparatus or in the interstice between the solid-state medium 10 and the deflection device 20 have to be reduced, it is generally not necessary to reduce the pressure to the same extent as in the case of the multipass cell 3 shown in FIGS. 1a and 1b. The pressure can be lowered in the manner described in the context of FIG. 1b, that is to say by using a housing and a pump device.

Should a gas with nonlinear optical properties be introduced into the housing, the nonlinear optical solid-state medium 2 can be dispensed with in the case of the apparatus 1 shown in FIG. 4 since the gas generates a nonlinear phase $\Phi_{NL}$ by self-phase modulation. In this case, the nonlinear optical solid-state medium 10 in the apparatus 1 may be replaced with a laser-active solid-state medium that serves to amplify the laser pulses 2.

Figure 8:
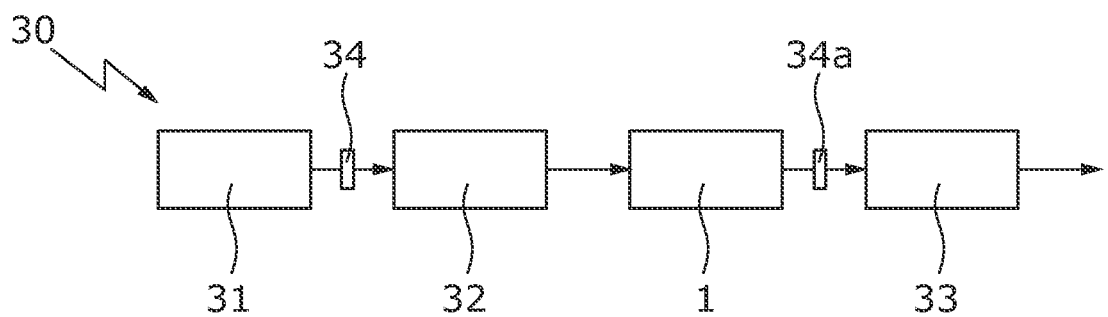
FIG. 8 shows a schematic representation of an optical system having an apparatus for spectral broadening and an apparatus for the temporal compression of the spectrally broadened laser pulses.

FIG. 8 shows an optical system 30 that is designed to generate ultrashort laser pulses with pulse durations of the order of, for example, less than 100 fs. The optical system 30 has a beam source 31 for generating laser pulses 2 which have pulse energies of the order of 1 mJ and pulse durations of the order of between, e.g., 200 fs and 2 ps. To generate the laser pulses 2 with such pulse parameters, the beam source 31 may have one or more amplifier chains with coherently combined or individual fiber, rod, disk or slab amplifiers or regenerative amplifiers, for example based on disk lasers, or the combinations thereof.

To shorten the pulse durations of the laser pulses 2 generated by the beam source 31 by a factor of, typically, 10-20, the optical system 30 comprises an apparatus 1 for the spectral broadening of the laser pulses 2 and an apparatus 33, situated downstream in the beam path, for the temporal compression of the spectrally broadened laser pulses 2'. The apparatus 1 for the spectral broadening of the laser pulses 2 is designed as described further above.

The apparatus 33 for the temporal compression of the laser pulses comprises one or more dispersive optical elements, which may be for example chirped or dispersive mirrors (e.g., GTI (Gires-Tournois interferometer) mirrors), prism compressors or grating compressors.

The optical system 30 shown in FIG. 8 also comprises an adjustment device 34 for setting a circular polarization state of the laser pulses 2 prior to the entry into the apparatus 1 for spectral broadening. In the example shown, a quarter wave plate is used as an adjustment device 34, which converts the linear polarization state of the laser pulses 2 emanating from the beam source 31 into a circular polarization state. In the example shown in FIG. 8, a further polarization-influencing adjustment device 34a, which converts the circular polarization state of the spectrally broadened laser pulses 2' back into a linear polarization state, is arranged between the apparatus 1 for spectral broadening and the apparatus 33 for temporal compression of the spectrally broadened laser pulses 2.

Moreover, the optical system 30 of FIG. 8 comprises a mode adaptation device 32 for adapting a beam caustic of the laser pulses 2 which are fed to the apparatus 1 for the spectral broadening of the laser pulses 2. In the example shown, the adaptation device 32 is a beam telescope (mode adaptation telescope), which adapts the beam caustic, that is to say the course of the transverse beam profiles along the optical propagation axis of the laser pulses 2, to match an (equivalent) transverse eigenmode of the multipass cell 3. In this case, the mode adaptation device 32 in the form of the beam telescope adapts the beam cross section or the beam diameter and also the divergence of the laser pulses 2 to match the transverse eigenmode of the multipass cell 3.

What can be achieved by the mode adaptation device 32 is that a ratio between a maximum beam diameter and a minimum beam diameter of the laser pulses 2 is generated that is less than twelve, less than six, in particular less than three in the case of all run-throughs, that is to say in the case of all reflections at a respective end mirror or at a respective mirror surface 6b, F, F2, F3, . . . or further mirror surface 7b, . . . in the multipass cell 3. The ratio between the maximum beam diameter and minimum beam diameter may also be significantly larger than twelve in the beam path W between the mirror surfaces 6b, 7b, that is to say between the optical units of the multipass cell 3.

To keep the spectral broadening of the laser pulses 2 constant for the subsequent compression in the apparatus 33 for temporal compression, the optical system 30 is embodied for closed-loop control of the pulse energy of the laser pulses 2 that enter the apparatus 1 for the spectral broadening of the laser pulses 2. To this end, the optical system 30 comprises at least one sensor, in the form of a photodiode in the example shown, which measures the pulse energy of the laser pulses 2 prior to entry into the apparatus 1 for spectral broadening. The result of the measurement is used by an open-loop and/or closed-loop control device of the optical system 30 to control the power of the radiation source 31 in order to keep the pulse energy constant.

The optical system 30 in FIG. 8 is also designed to correct or keep constant the beam position of the laser pulses 2 or the pulsed laser beam prior to the entry into the apparatus 1 for the spectral broadening. To this end, the optical system 30 comprises position-sensitive photodiodes (e.g., lateral effect diodes or segmented quadrant position detectors) and cameras. For controlling the input coupling of the laser pulses 2 into the apparatus 1 for spectral broadening, it is advantageous if the beam size, in particular the beam diameter, on one or more mirrors or lenses in the beam path of the laser pulses 2 is observed by one or more cameras prior to the entry into the apparatus 1 for spectral broadening or else within the apparatus 1 for spectral broadening. In particular, the cameras may also be arranged at or behind selected mirror surfaces 6b, F, F2, F3, . . . of the multipass cell 3.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An apparatus for spectral broadening of laser pulses, the apparatus comprising:
   a main body;
   a plurality of individual mirror elements fastened to the main body, each mirror element having a discrete mirror surface formed thereon and configured to reflect the laser pulses, and
   at least one nonlinear optical medium for passage of the laser pulses for generating a nonlinear phase ($\Phi_{NL}$) by self-phase modulation,
   wherein the at least one nonlinear optical medium includes at least two nonlinear optical solid-state media, each respective nonlinear optical solid-state medium fastened to a surface of a respective mirror element, and wherein the at least two nonlinear optical solid-state media have different thicknesses.

2. The apparatus as claimed in claim 1, further comprising:
   a further main body; and
   a plurality of individual further mirror elements fastened to the further main body, each further mirror element having a discrete further mirror surface formed thereon, wherein the main body and the further main body are arranged at a distance from one another so as to form a multipass cell.

3. The apparatus as claimed in claim 2, wherein a further nonlinear optical solid-state medium is fastened to a surface of at least one of the further mirror elements.

4. The apparatus as claimed in claim 2, wherein the distance between the main body and the further main body is less than 1.5 m.

5. The apparatus as claimed in claim 2, further comprising: a housing, in which the multipass cell is arranged.

6. The apparatus as claimed in claim 5, wherein the at least one non-linear optical medium includes a nonlinear gaseous medium disposed in the housing.

7. The apparatus as claimed in claim 1, wherein the at least two nonlinear optical solid-state media include at least three nonlinear optical solid-state media arranged adjacent to one another in a beam path of the laser pulses, with lengths of sections of the beam path between adjacent nonlinear optical solid-state media being different.

8. The apparatus as claimed in claim 1, wherein the mirror surface of the respective mirror element is formed by a reflective coating on a side of the respective nonlinear optical solid-state medium that faces the respective mirror element.

9. The apparatus as claimed in claim 1, wherein the mirror surface of at least one mirror element is concavely curved.

10. The apparatus as claimed in claim 9, wherein the mirror surface of the at least one mirror element has a radius of curvature of less than 1000 m and more than 10 m.

11. The apparatus as claimed in claim 1, wherein the mirror surfaces of the plurality of mirror elements are located on a common spherical surface.

12. The apparatus as claimed in claim 11, wherein a radius of curvature of the common spherical surface is between 1 m and 15 m.

13. The apparatus as claimed in claim 1, wherein the mirror elements are connected to the main body via a respective connecting portion.

14. The apparatus as claimed in claim 1, wherein the nonlinear optical medium comprises a nonlinear optical solid-state medium having a thickness of less than 1 mm.

15. An optical system comprising:
    a beam source for generating laser pulses,
    an apparatus for spectral broadening of the laser pulses as claimed in claim 1, and
    an apparatus for temporal compression of the spectrally broadened laser pulses.

16. The optical system as claimed in claim 15, further comprising:

an adjustment device for setting a circular polarization state of the laser pulses input coupled into the apparatus for the spectral broadening of the laser pulses.

17. The optical system as claimed in claim 15, further comprising:
a mode adaptation device for adapting a beam caustic of the laser pulses input coupled into the apparatus for the spectral broadening to match a transverse eigenmode of a multipass cell.

18. An apparatus for spectral broadening of laser pulses, the apparatus comprising:
a main body disposed at a first end of a multipass cell,
a plurality of individual mirror elements fastened to the main body, each mirror element having a discrete mirror surface formed thereon and configured to reflect the laser pulses, wherein the plurality of mirror elements form a deflection device,
at least one nonlinear optical medium for passage of the laser pulses for generating a nonlinear phase ($\Phi_{NL}$) by self-phase modulation, and
a single end mirror disposed at a second end of the multipass cell opposite to the first end, wherein the mirror surfaces of the plurality of mirror elements are aligned such that the laser pulses are deflected from a respective mirror surface to another mirror surface via the at least one nonlinear optical medium or via an exposed mirror surface of the single end mirror.

19. The apparatus as claimed in claim 18, wherein the at least one nonlinear optical medium has a first mirror surface.

20. The apparatus as claimed in claim 18, wherein the plurality of mirror elements is arranged on the main body in at least one annulus.

21. The apparatus as claimed in claim 18, wherein the at least one nonlinear optical medium comprises a disk-shaped nonlinear optical solid-state medium, and wherein at least two of the mirror elements between which the laser pulses are deflected to the disk-shaped nonlinear optical solid-state medium and back again are arranged at different radial distances from a center axis of the main body so as to generate a point of incidence of the laser pulses that is offset from a center on the disk-shaped nonlinear optical solid-state medium.

22. The apparatus as claimed in claim 18, wherein the deflection device is formed to deflect the laser pulses between at least two mirror surfaces between two successive deflections to the nonlinear optical solid-state medium or the exposed mirror surface of the single end mirror.

23. The apparatus as claimed in claim 18, wherein the deflection device has at least one further mirror element with a curved mirror surface, with the laser pulses being deflected from a first mirror element of the plurality of mirror elements to the further mirror element and being deflected from the further mirror element to a second mirror element of the plurality of mirror elements.

24. The apparatus as claimed in claim 23, wherein a further nonlinear optical solid-state medium is fastened to a surface of the further mirror element.

25. The apparatus as claimed in claim 18, wherein a respective mirror element has a planar mirror surface aligned to directly reflect the laser pulses from the nonlinear optical solid-state medium or from the exposed mirror surface of the single end mirror back to the nonlinear optical solid-state medium or back to the exposed mirror surface of the single end mirror.

26. The apparatus as claimed in claim 18, wherein a distance between the main body and the disk-shaped nonlinear optical solid-state medium or the exposed mirror surface of the single end mirror is less than 1.5 m.

27. The apparatus as claimed in claim 18, wherein the at least one nonlinear optical medium includes at least one of a solid-state optical medium or a gaseous optical medium.

* * * * *